(12) United States Patent
Cramer et al.

(10) Patent No.: US 10,328,508 B2
(45) Date of Patent: Jun. 25, 2019

(54) SAW MOUNT SYSTEM AND METHOD

(71) Applicant: Roughneck L.L.C., Rosemount, MN (US)

(72) Inventors: Robert W. Cramer, Lakeville, MN (US); Justin R. Kendall, Rosemount, MN (US)

(73) Assignee: Roughneck L. L. C., Webster, MN (US)

( * ) Notice: Subject to any disclaimer, the term of this patent is extended or adjusted under 35 U.S.C. 154(b) by 91 days.

(21) Appl. No.: 15/385,600

(22) Filed: Dec. 20, 2016

(65) Prior Publication Data

US 2017/0173712 A1 Jun. 22, 2017

Related U.S. Application Data

(60) Provisional application No. 62/360,118, filed on Jul. 8, 2016, provisional application No. 62/270,491, filed on Dec. 21, 2015.

(51) Int. Cl.

| | |
|---|---|
| *B23D 59/00* | (2006.01) |
| *B28D 1/04* | (2006.01) |
| *B25H 1/00* | (2006.01) |
| *B23D 47/00* | (2006.01) |
| *B23D 47/02* | (2006.01) |
| *B25H 1/04* | (2006.01) |
| *B28D 7/00* | (2006.01) |

(52) U.S. Cl.
CPC .......... *B23D 59/007* (2013.01); *B23D 47/00* (2013.01); *B23D 47/02* (2013.01); *B25H 1/0042* (2013.01); *B25H 1/04* (2013.01); *B28D 1/047* (2013.01); *B28D 7/00* (2013.01)

(58) Field of Classification Search
CPC .................................................... B23D 59/007
See application file for complete search history.

(56) References Cited

U.S. PATENT DOCUMENTS

| 1,770,294 A | * | 7/1930 | Blundell | B27B 5/22 |
| | | | | 83/435.15 |
| 2,726,651 A | * | 12/1955 | Tucker | B28D 1/042 |
| | | | | 125/13.03 |
| 2,736,311 A | | 2/1956 | Coates | |

(Continued)

FOREIGN PATENT DOCUMENTS

CN 105034046 A * 11/2015

*Primary Examiner* — Jennifer B Swinney
(74) *Attorney, Agent, or Firm* — Jonathan M. Rixen; Lemaire Patent Law Firm, P.L.L.C.

(57) ABSTRACT

Systems and methods for a table-mounted stand that houses a hand-held masonry cut-off saw. In some embodiments, the stand provides a fixed mount that keeps the saw stationary while the operator is allowed to feed the work piece through the saw with both hands. In some embodiments, the stand is configured to mount and un-mount the saw without the need for separate tools or time-consuming restraints. In some embodiments, the stand includes a throttle control that is activated via foot control, which allows for two-hand manipulation of the work piece being cut by the saw mounted on the stand. In some embodiments, the two-handed work-piece manipulation provided by the stand allows for precise curved and multi-angled cuts. In some embodiments, the stand is made of lightweight construction (e.g., aluminum) for ease of setup and mobilization.

22 Claims, 26 Drawing Sheets

(56) References Cited

U.S. PATENT DOCUMENTS

| | | | | |
|---|---|---|---|---|
| 2,851,067 | A | * | 9/1958 | Greenslate .......... B27B 17/0058 |
| | | | | 83/574 |
| 3,807,095 | A | * | 4/1974 | Harding ............... B23D 47/025 |
| | | | | 125/13.03 |
| 4,351,209 | A | * | 9/1982 | Alford ............... B23D 57/0092 |
| | | | | 108/119 |
| 4,428,159 | A | * | 1/1984 | Sigetich ................ B28D 1/047 |
| | | | | 125/13.03 |
| 4,538,494 | A | * | 9/1985 | Wirfelt ................ B27B 17/0058 |
| | | | | 83/574 |
| 4,553,463 | A | * | 11/1985 | Engel ................. B27B 17/0058 |
| | | | | 123/398 |
| 4,757,735 | A | * | 7/1988 | Olson ................. B27B 17/0058 |
| | | | | 83/527 |
| 5,746,193 | A | | 5/1998 | Swan |
| 6,112,736 | A | | 9/2000 | Bearden |
| 7,080,851 | B2 | | 7/2006 | Schipper |
| 7,905,223 | B2 | | 3/2011 | von Siegroth |
| 2002/0178884 | A1 | * | 12/2002 | Chuang ................. B23D 45/10 |
| | | | | 83/24 |
| 2016/0107326 | A1 | * | 4/2016 | Zimmermann ......... F16N 11/04 |
| | | | | 30/383 |

\* cited by examiner

SAW MOUNT SYSTEM AND METHOD

CROSS-REFERENCE TO RELATED APPLICATIONS

This application claims priority benefit, under 35 U.S.C. § 119(e), of U.S. Provisional Patent Application No. 62/270,491 filed Dec. 21, 2015 by Robert W. Cramer and Justin R. Kendall, titled "Saw mount system and method," and of U.S. Provisional Patent Application No. 62/360,118 filed Jul. 8, 2016 by Robert W. Cramer and Justin R. Kendall, titled "System and method for a saw mount," each of which is incorporated herein by reference in its entirety.

FIELD OF THE INVENTION

The present invention relates generally to tool-mount assemblies, and in particular to a system and method for mounting a hand-held power saw.

BACKGROUND OF THE INVENTION

Two commonly-used tools for cutting masonry (e.g., concrete/clay brick, block, stone, tile, and other material of the like) are hand-held gas-powered cut-off saws (referred to herein as "cut-off saws") and standard four-stroke gas-powered fixed table saws or tub saws (referred to herein collectively as "tub saws"). Tub saws generally provide more precision and control than cut-off saws, but cut-off saws are widely used because they have many other advantages over tub saws. For example, the two-stroke engines of cut-off saws provide much higher revolutions-per-minute (RPM) than tub saws, and cut-off saws are generally much cheaper than tub saws (e.g., a typical tub saw costs around $4,000, whereas a typical cut-off saw costs around $600).

U.S. Pat. No. 2,736,311 to Neligh C. Coates (hereinafter, "Coates") titled "TRACK MOUNTED CUTTER FOR CONCRETE SLABS AND THE LIKE", issued Feb. 28, 1956, and is incorporated herein by reference in its entirety.

U.S. Pat. No. 5,746,193 to Leo Swan (hereinafter, "Swan") titled "PRESS ASSEMBLY FOR A PORTABLE MASONRY CUT-OFF SAW", issued May 5, 1998, and is incorporated herein by reference in its entirety. Swan describes an assembly in the form of a press for holding a conventional hand-held portable gasoline engine powered masonry cut-off saw. The assembly includes a vertical frame secured to a pan and on which the cut-off saw is pivotally mounted. The frame is detachable for ease of transport and shipment. A gas bias spring acts to normally position the cut-off saw up and away from a movable work table positioned on the pan. A support plate affixed to a pivot shafted mounted on the frame includes means at both ends for positioning and firmly holding the saw in place during a cutting operation. The speed and on-off control of the saw is provided by a twist hand grip throttle mounted on the outer end of an operator actuated lever arm secured to the pivot shaft. The twist grip throttle is coupled by means of a cable to a trigger actuable blade speed control assembly mounted on the hand grip at the rear end of the cut-off saw.

U.S. Pat. No. 6,112,736 to Martin A. Bearden (hereinafter, "Bearden") titled "PORTABLE SAW WITH IMPROVED DISCONNECTABLE PLATFORM FOR CUTTING CONCRETE FOR CONTROLLING CRACKS", issued Sep. 5, 2000, and is incorporated herein by reference in its entirety. Bearden describes an apparatus for cutting grooves in a green concrete slab having at least one terminating side edge transverse to a broad top surface in a low cost manner is described and includes the following elements: a hand-held portable rotary saw, supported on a rollable platform disconnectably connected to and supporting the relative to the green concrete slab. The rollable platform includes a planar base in surface contact with a conventional guide plate of the saw, and flared side walls extending outwardly from the planar base an anchoring portion adapted to receive a human-generated force to provide rectilinear travel along a preselected direction over the green concrete slab. The planar base also includes a slot in alignment with an opening in the guide plate through which the saw blade extends whereby a working plane of reference is defined that intersects an axis of rotation of the saw blade whereby a maximum depth of cut is easily defined coincident with the working plane of reference. The rollable platform also includes a set of rollers in rolling contact with the green concrete slab to facilitate the rectilinear travel wherein first and second pairs of rollers define parallel axes of rotation normal to said pre-selected direction of travel that facilitate operations in a low cost manner.

U.S. Pat. No. 7,080,851 to Ulf Schipper (hereinafter, "Schipper") titled "GUIDE CART", issued Jul. 25, 2006, and is incorporated herein by reference in its entirety. Schipper describes a guide cart for an implement including a frame on which is disposed at least two wheels, and a first strut on which is disposed at least one wheel, and a second strut, wherein for a mounting of said second strut on said frame at least two spaced-apart mounting points are provided.

U.S. Pat. No. 7,905,223 to Stefan von Siegroth, et al. (hereinafter, "Von Siegroth, et al.") titled "GUIDE CART AND POWER TOOL WITH GUIDE A CART", issued Mar. 15, 2011, and is incorporated herein by reference in its entirety. Von Siegroth, et al. describe a guide cart for a hand-held power tool with a driven tool has a pivot device that is pivotable between an open position and a fixation position. A fixation elements is provided that releasably secures the power tool on the guide cart. The fixation element is secured on the pivot device. The pivot device has at least one support for supporting a tool of the power tool in the fixation position of the pivot device. The guide cart has a holder for the power tool, wherein holder is provided with a base plate and has at least one lateral guide for the power tool. The pivot device is supported on the base plate. The pivot device and the baseplate together form a C-shaped frame.

Accordingly, there is a need for improved systems and methods for making precise masonry cuts with a cut-off saw.

SUMMARY OF THE INVENTION

In some embodiments, the present invention provides an apparatus for mounting a power saw, wherein the power saw includes a saw motor that has a throttle that is controlled by a throttle button on the power saw, the apparatus including a stand; a base unit configured to removably couple to the stand, wherein the base unit includes: a saw mount configured to removably couple to the power saw in order to hold the power saw in a fixed position during operation of the power saw, and a trigger mechanism configured to selectively engage the throttle button on the power saw; and a hands-free throttle controller operatively coupled to the trigger mechanism and configured to provide operator control of the throttle of the saw motor.

In some embodiments, the present invention provides a method a method for operating a hand-held power saw on a portable mount system, wherein the power saw includes a saw motor that has a throttle that is controlled by a throttle button on the power saw, the method including providing a foldable stand and a base unit, wherein the base unit includes a saw mount; unfolding the foldable stand; coupling the base unit to the unfolded stand; coupling the power saw to the saw mount of the base unit such that the power saw is held in a fixed position; starting the saw motor; and controlling the throttle of the started motor by an operator without using either of the operator's hands.

In some embodiments, the present invention provides an apparatus for mounting a hand-held power saw, wherein the power saw includes a saw motor that has a throttle that is controlled by a throttle button on the power saw, the apparatus including a stand; a base unit configured to removably couple to the stand, wherein the base unit includes a saw mount configured to removably couple to the power saw in order to hold the power saw in a fixed position during operation of the power saw; and means for hands-free controlling the throttle of the saw motor.

DETAILED DESCRIPTION OF THE INVENTION

Figure 1A:
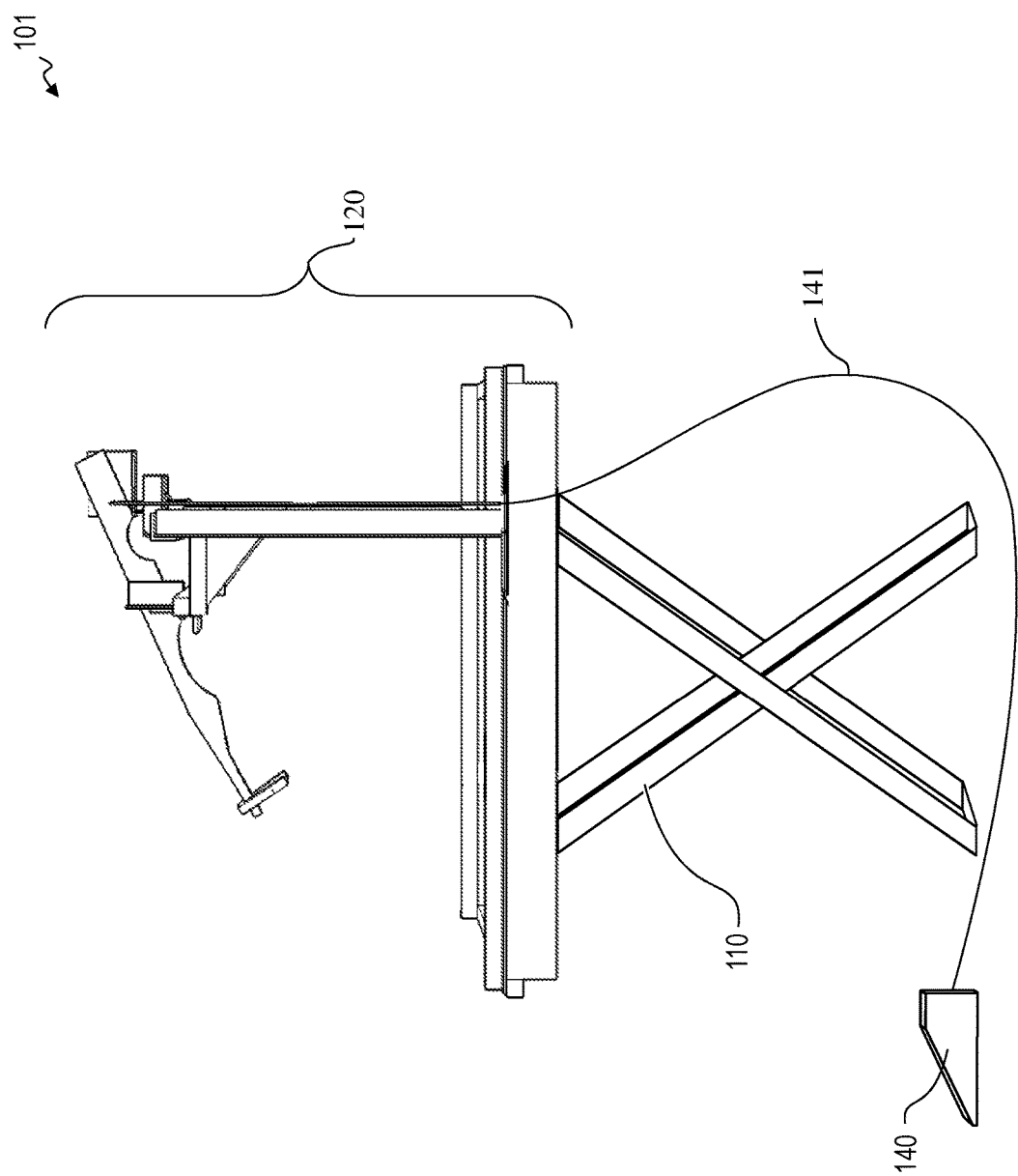
FIG. 1A is a perspective side view of a saw-mount system 101, according to some embodiments of the present invention.

Although the following detailed description contains many specifics for the purpose of illustration, a person of ordinary skill in the art will appreciate that many variations and alterations to the following details are within the scope of the invention. Specific examples are used to illustrate particular embodiments; however, the invention described in the claims is not intended to be limited to only these examples, but rather includes the full scope of the attached claims. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

It is specifically contemplated that the present invention includes embodiments having combinations and subcombinations of the various embodiments and features that are individually described herein (i.e., rather than listing every combinatorial of the elements, this specification includes descriptions of representative embodiments and contemplates embodiments that include some of the features from one embodiment combined with some of the features of another embodiment, including embodiments that include some of the features from one embodiment combined with some of the features of embodiments described in the patents and application publications incorporated by reference in the present application). Further, some embodiments include fewer than all the components described as part of any one of the embodiments described herein.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

Certain marks referenced herein may be common-law or registered trademarks of third parties affiliated or unaffiliated with the applicant or the assignee. Use of these marks is for providing an enabling disclosure by way of example and shall not be construed to limit the scope of the claimed subject matter to material associated with such marks.

In some embodiments, the present invention adds the precision and control of a tub saw to the speed, power, and portability of a two-stroke hand-held cut-off saw. In some embodiments, the present invention provides a cost-effective cutting solution since one saw can be purchased for multiple applications, as opposed to purchasing both a cut-off saw and a tub saw. In some embodiments, the throttle-control design of the present invention allows the operator to easily limit the fuel consumption of the mounted saw by only increasing saw engine speed when materials are being cut (in contrast, the standard tub saw is made to run at top throttle speed for most or all of use).

In some embodiments, the stand of the present invention is light and easily set up by one person, the stand allows the portable hand-held gas-powered masonry cut-off saw to be easily mounted to provide for precise and plum cuts of brick and other material, and the stand includes the convenience of a remotely controlled foot throttle.

In some embodiments, the saw mount of the present invention is much lighter than a tub saw, which allows one person to transport and set up the mount and couple the saw to the mount. In some embodiments, the saw mount of the present invention requires no tools or time-consuming restraints such that a saw can be quickly and easily placed in the saw mount. In some embodiments, the saw mount includes a two-point mounting system: (1) a fork-shaped hood-support that secures the saw hood in a fixed position, and (2) an L-shaped hook that secures the handle of the saw. In some embodiments, the saw mount includes: (1) a platform configured to support a bottom portion of the saw, and (2) a pivotable connection arm coupled to the platform and configured to pivot between an open position and a closed position, wherein the connection arm is configured to couple to a top portion of the saw when the saw is placed on the platform and the connection arm is placed in the closed position, wherein the connection arm includes a hood support configured to couple to a hood of the saw. In some embodiments, the present invention provides for more powerful and faster cutting capabilities by mounting the two-stroke single-belt-driven system of a handheld gas-powered cut-off saw. In some embodiments, the present invention is cost effective because it allows the contractor to use one saw for a variety of different applications and cutting materials. In some embodiments, the present invention provides a foot-pedal throttle control that allows user to more efficiently control the power to the saw as compared to conventional throttle controls such as a handle control, lever, dial, knob, or permanent set. In some embodiments, the present invention also allows the operator to use both hands in a safer, more versatile manipulation of the material being cut. In some embodiments, the present invention includes the versatility to accommodate a wide variety of brands/makes of saws.

FIG. 1A is a perspective side view of a saw-mount system 101, according to some embodiments of the present invention. In some embodiments, system 101 is configured to provide a portable assembly for mounting a power saw such as a cut-off saw. In some embodiments, system 101 includes an upper unit 120 and a support unit 110 that are configured to be removably connected to each other. In some embodiments, support unit 110 is foldable for easy transport. In some embodiments, system 101 includes a throttle mechanism 140 operably coupled to upper unit 120 via a connector 141.

Figure 1B:
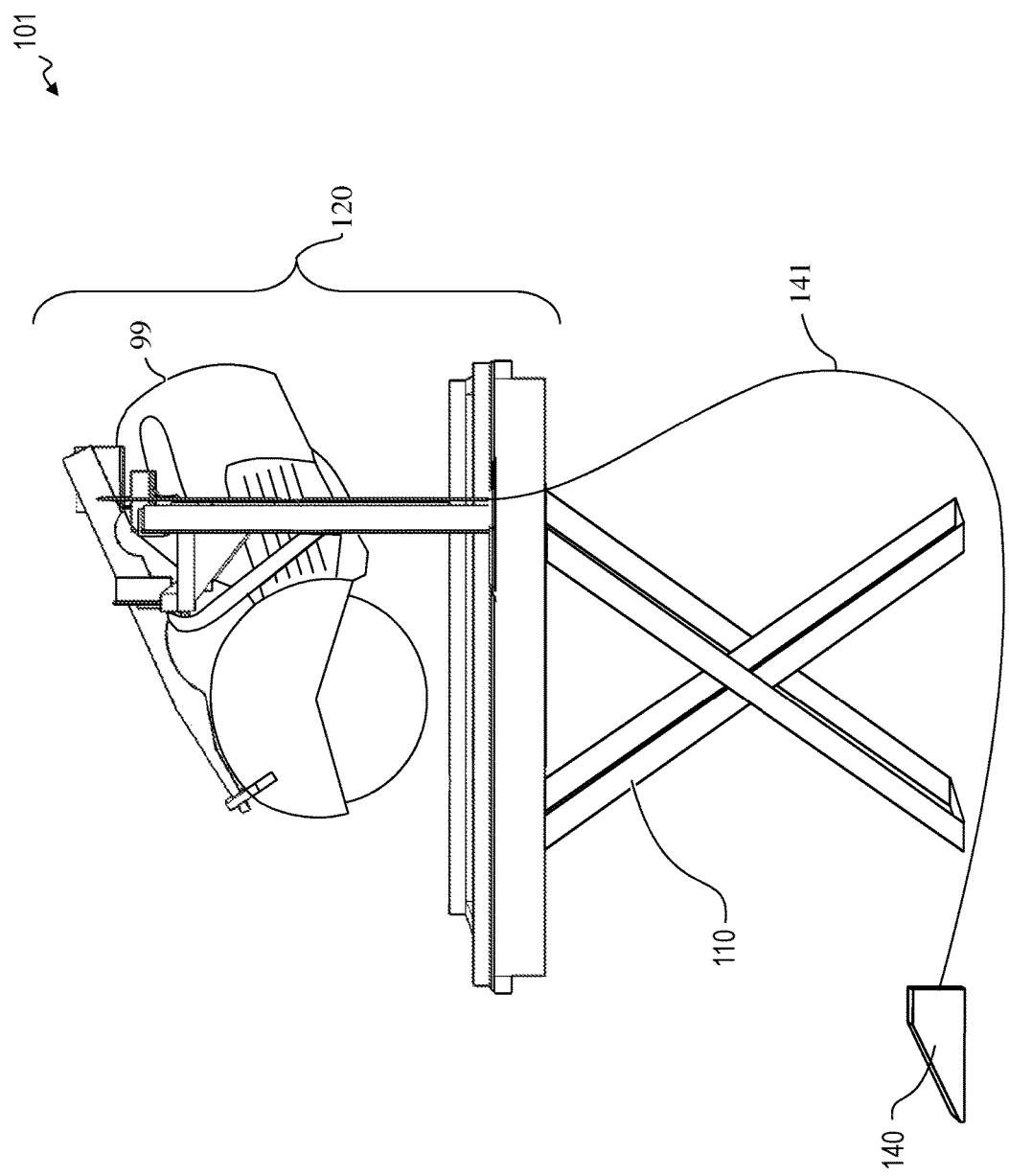
FIG. 1B is a perspective side view of saw-mount system 101 supporting a cut-off saw 99, according to some embodiments of the present invention.

FIG. 1B is a perspective side view of saw-mount system 101 supporting a cut-off saw 99, according to some embodiments of the present invention. In some embodiments, system 101 includes an auxiliary fuel tank coupled to upper unit 120 and configured to provide additional fuel to saw 99. In some such embodiments, the auxiliary fuel tank is line fed to saw 99 through a secondary gas cap on saw 99. In some embodiments, system 101 is configured to provide unimpeded paths for a water line coupled to saw 99 in order to support water cutting. In some embodiments, system 101 includes a hook up and mount for a dust collection system operatively coupled to saw 99. In some embodiments, system 101 is constructed of a material such as aluminum. In other embodiments, system 101 is constructed of any other suitable material such as steel, fiberglass, carbon fiber, or the like. In some embodiments, system 101 includes a light (e.g., a light-emitting-diode (LED) fixture or the like) coupled to upper unit 120 to provide for low-light cutting operations. In some embodiments, system 101 includes wheels or castors to assist with the portability of system 101. In some such embodiments, system 101 includes wheels on the back side of the frame base of upper unit 120. In some embodiments, system 101 is compatible with saws and/or blades for cutting non-masonry materials such as metal.

Figure 1C:
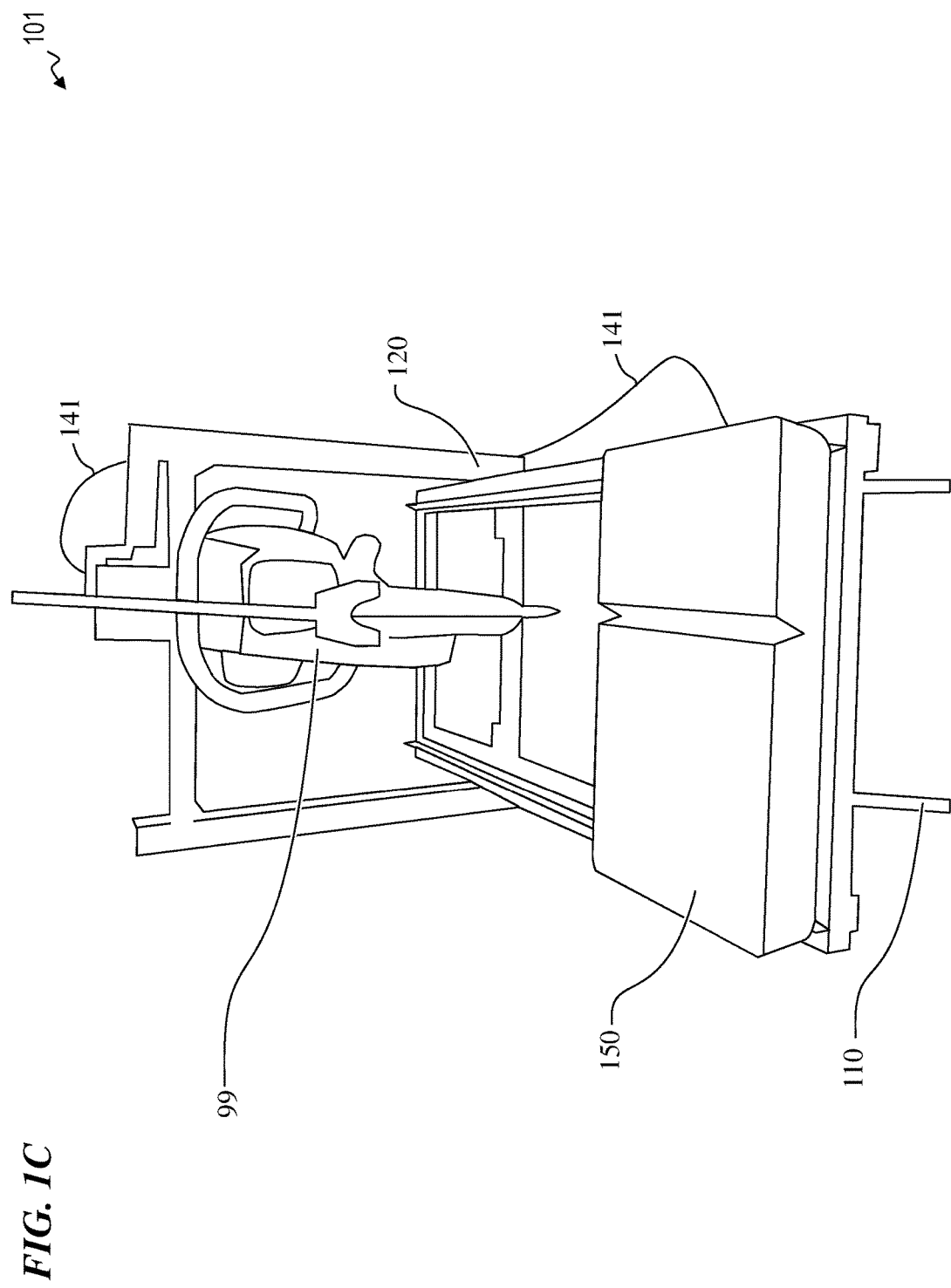
FIG. 1C is a perspective front view of saw-mount system 101 with a work table 150, according to some embodiments of the present invention.

FIG. 1C is a perspective front view of saw-mount system 101 with a work table 150, according to some embodiments of the present invention. In some embodiments, work table 150 is configured to slide across the frame base of upper unit 120 (see, for example, frame base 121 shown in FIG. 1E) such that a work piece can be precisely cut with cut-off saw 99.

Figure 1D:
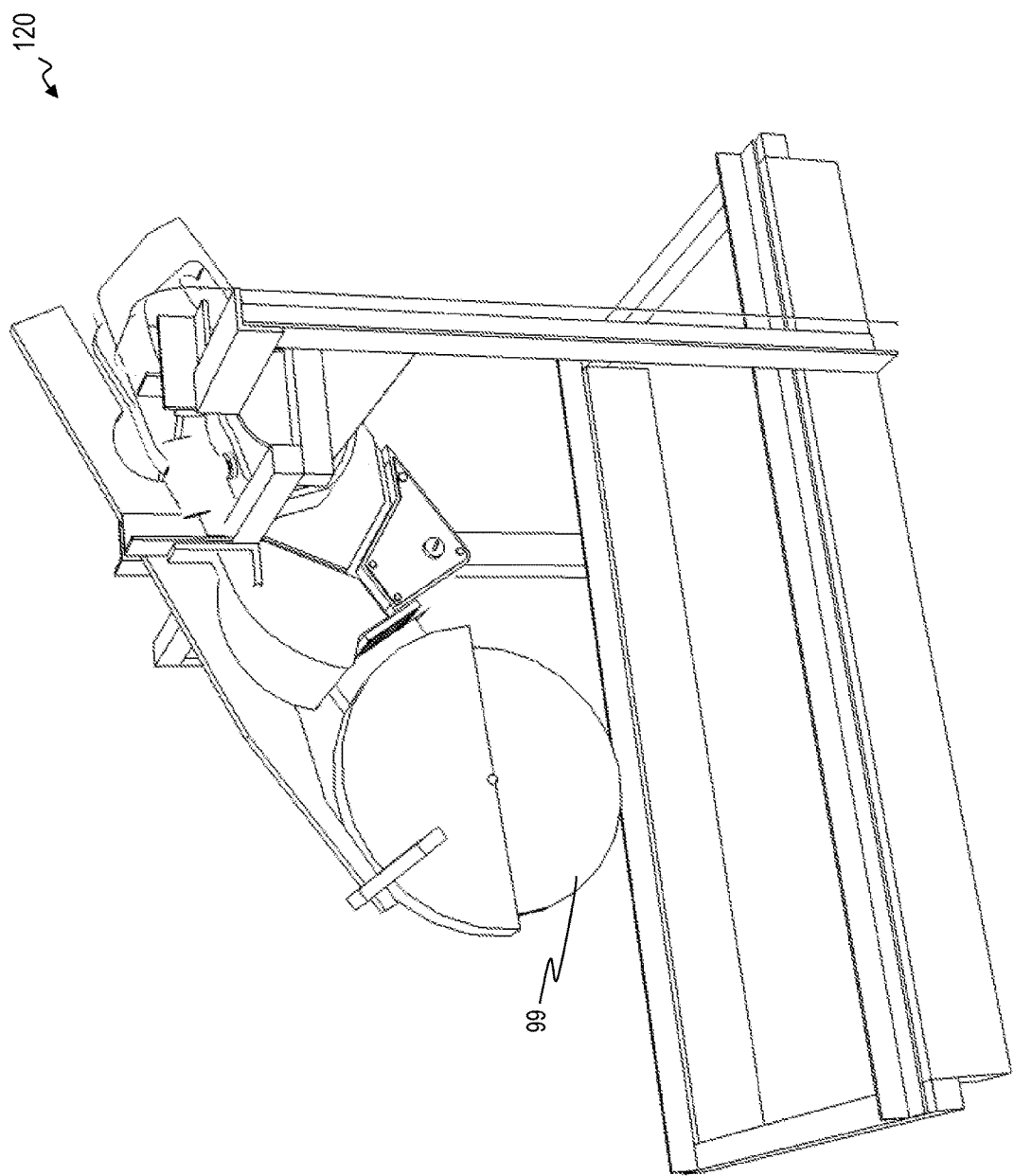
FIG. 1D is a perspective view of upper unit 120 of saw-mount system 101, according to some embodiments of the present invention.

FIG. 1D is a perspective view of upper unit 120 of saw-mount system 101, according to some embodiments of the present invention.

Figure 1E:
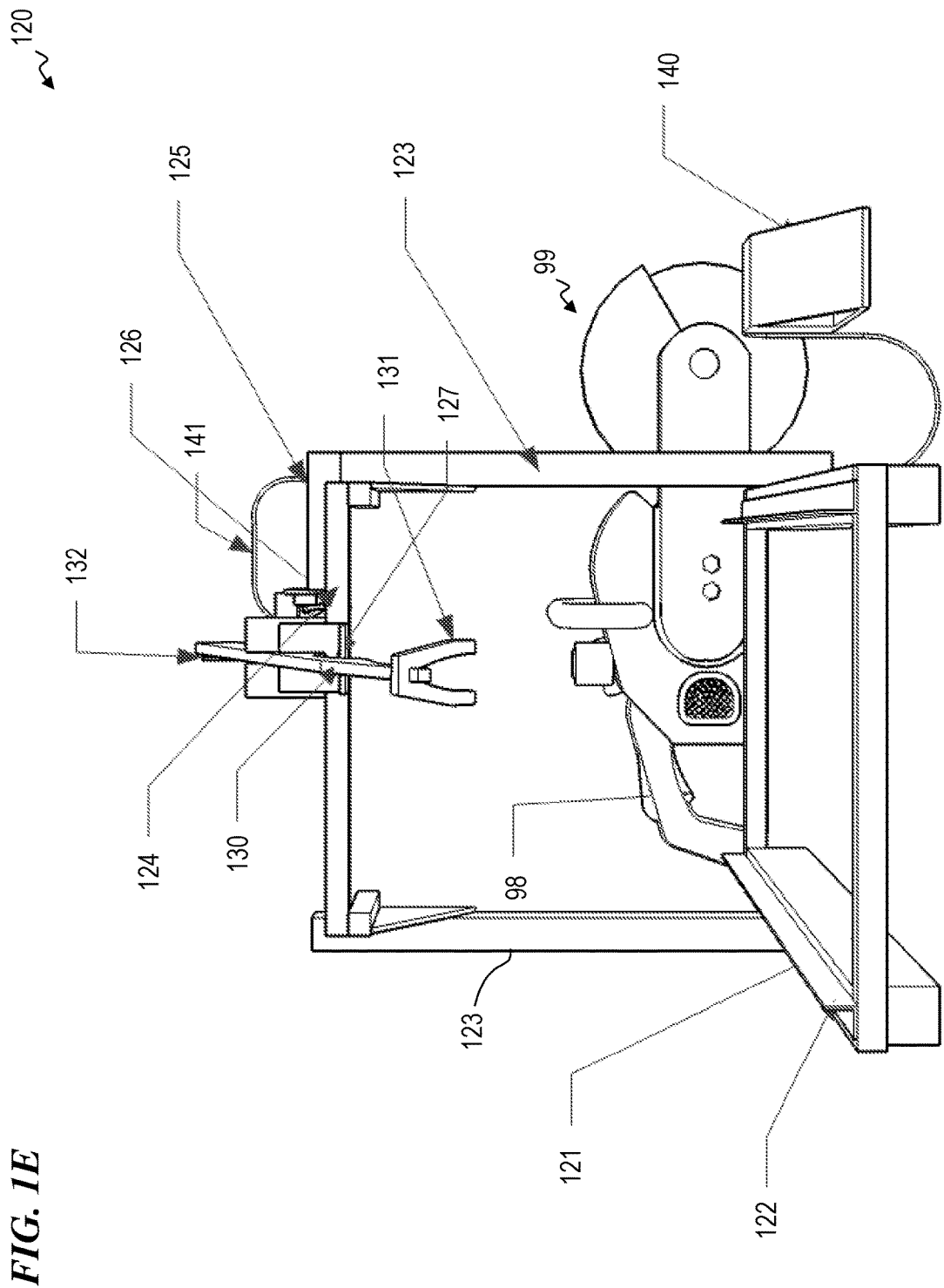
FIG. 1E is a perspective front view of upper unit 120 of saw-mount system 101, according to some embodiments of the present invention.

FIG. 1E is a perspective front view of upper unit 120 of saw-mount system 101, according to some embodiments of the present invention. In some embodiments, upper unit 120 is configured to provide a mount assembly for holding hand-held masonry cut-off saw 99. In some embodiments, upper unit 120 includes a frame base 121 that includes rails 122 configured to guide a sliding table (see, for example, work table 150 of system 101 in FIG. 1C). In some such embodiments, table 150 includes rollers (e.g., wheels, casters, v-groove wheels/casters, or the like) that move along rails 122 of base 121. In some embodiments, upper unit 120 includes vertical arms 123 that are attached to base 121. In some embodiments, vertical arms 123 support a cross member 124 and a pivoting throttle trigger arm 125. In some embodiments, the height of cross member 124 is adjustable such that the height of a mounted saw 99 is adjustable over base 121.

In some embodiments, an L-shaped hook 127 is attached to cross member 124, and, in some such embodiments, hook 127 supports the handle of cut-off saw 99. In some embodiments, hook 127 is configured to support a TS 420 Stihl Cutquick® cut-off saw (www.stihlusa.com/products/cut-off-machines/). In other embodiments, the size and/or shape of hook 127 is modified to accommodate other models of cut-off saws 99 (e.g., a Husgvarna® K 760 power cutter). In some such embodiments, hook 127 includes an adjustable (e.g., by tightening a screw) vice-style stabilizer that is configured to hold the handle of saw 99 in a fixed position. In some embodiments, an arm 130 that runs perpendicular to cross member 124 is attached to cross member 124. In some embodiments, the angle formed between cross member 124 and arm 130 is adjustable. In some embodiments, arm 130 includes a hood support 131 that is configured to hold the hood of the cut-off saw 99. In some embodiments, hood support 131 has a forked-shaped configured to support the TS 420 Stihl Cutquick® cut-off saw. In other embodiments, the size and/or shape of hood support 131 is modified to accommodate other models of cut-off saws 99. In some such embodiments, hood support 131 includes an adjustable (e.g., by tightening a screw) vice-style hood stabilizer that is configured to hold the hood of saw 99 in a fixed position.

In some embodiments, arm 130 includes a trigger-release member 132 that is configured to press and hold the trigger release of saw 99. In some embodiments, member 132 is L-shaped. In other embodiments, member 132 is any other suitable shape. In some embodiments, upper unit 120 includes throttle mechanism 140 that is configured to control the throttle of saw 99 (both starting/stopping the blade from spinning and controlling the speed of the spinning blade) such that the operator can use two hands to manipulate the work piece during cutting. In some embodiments, throttle mechanism 140 includes a foot peddle that is operatively coupled to a trigger mechanism 126 located on swing arm 125. In some embodiments, throttle mechanism 140 is operatively coupled to trigger mechanism 126 via a connector 141. In some embodiments, connector 141 is a cable that causes trigger mechanism 126 to engage the throttle button 98 on saw 99 when the foot peddle is depressed. In some embodiments, the location, size, and/or shape of trigger mechanism 126 is modified to accommodate other models of saw 99. In some embodiments, throttle mechanism 140 is a hydraulic mechanism and connector 141 is a hydraulic line that operably couples mechanism 140 to mechanism 126. In some embodiments, throttle mechanism 140 is an electrical mechanism and connector 141 is an electrical line that operably connects mechanism 140 to a servomotor-based mechanism 126. In some embodiments, throttle mechanism 140 is an electrical mechanism that is wirelessly coupled to a battery-powered servomotor-based mechanism 126.

Figure 1F:
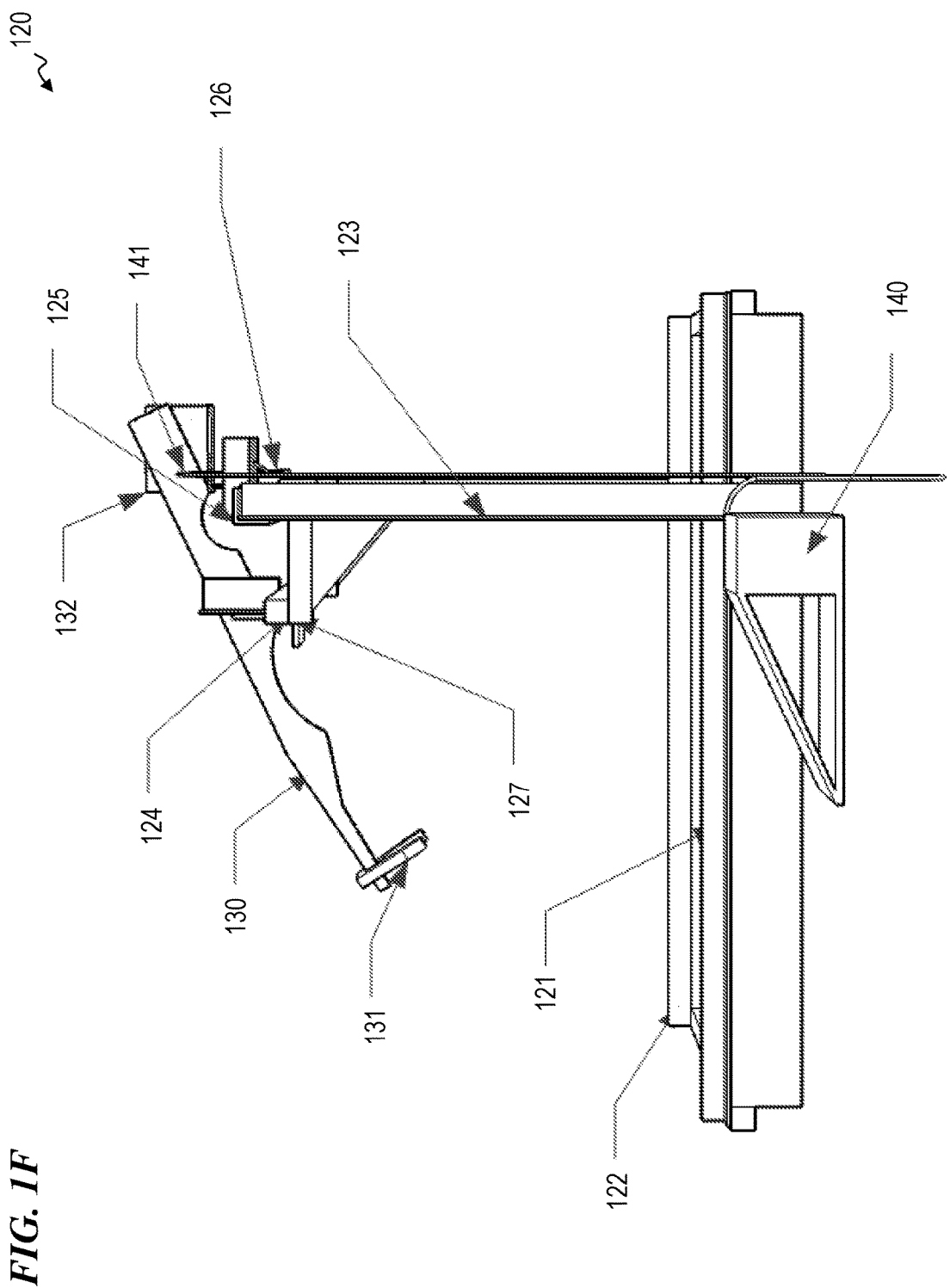
FIG. 1F is a perspective first-side view of upper unit 120 of saw-mount system 101, according to some embodiments of the present invention.

FIG. 1F is a perspective first-side view of upper unit 120 of saw-mount system 101, according to some embodiments of the present invention.

Figure 1G:
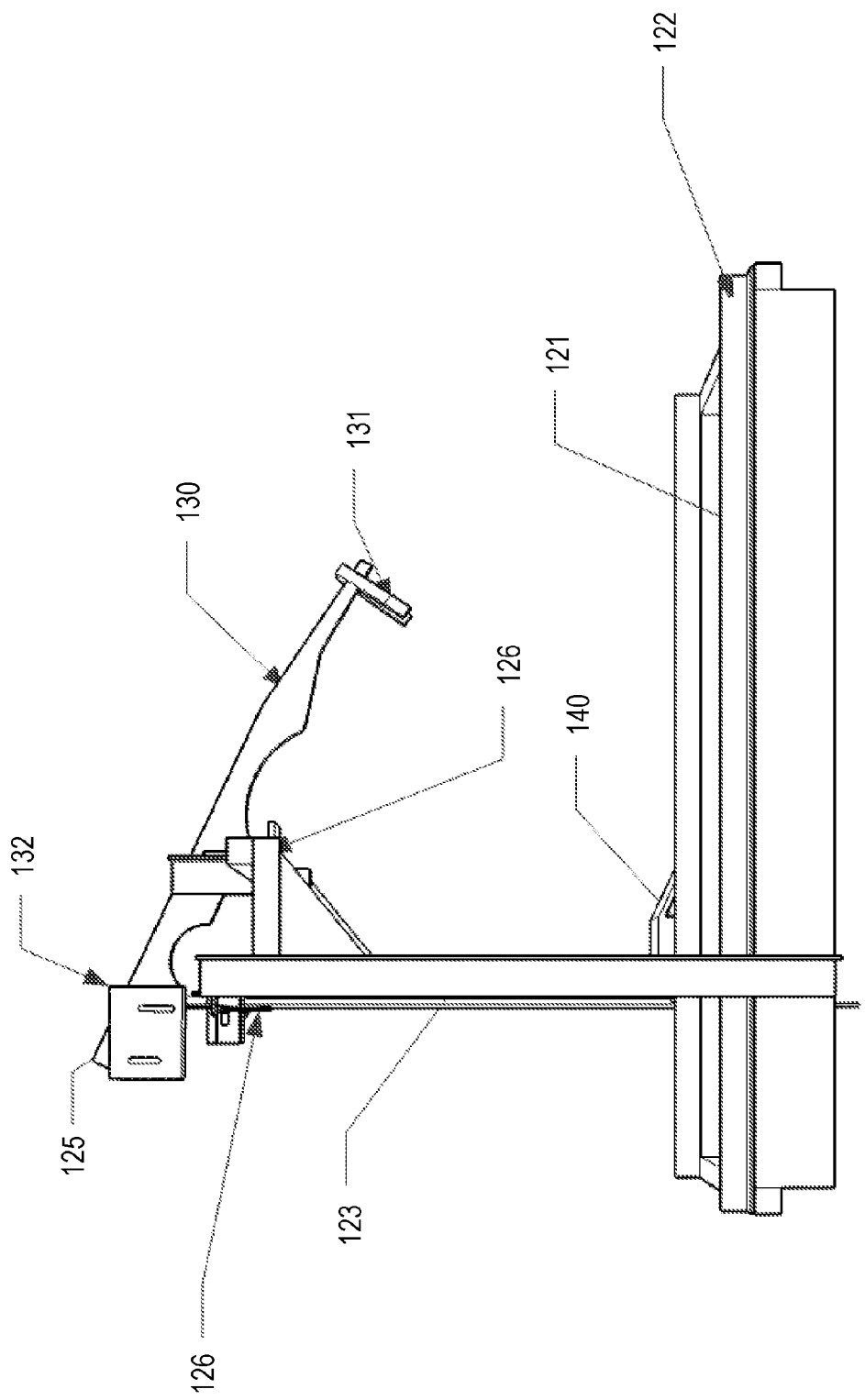
FIG. 1G is a perspective second-side view of upper unit 120 of saw-mount system 101, according to some embodiments of the present invention.

FIG. 1G is a perspective second-side view of upper unit 120 of saw-mount system 101, according to some embodiments of the present invention.

Figure 1H:
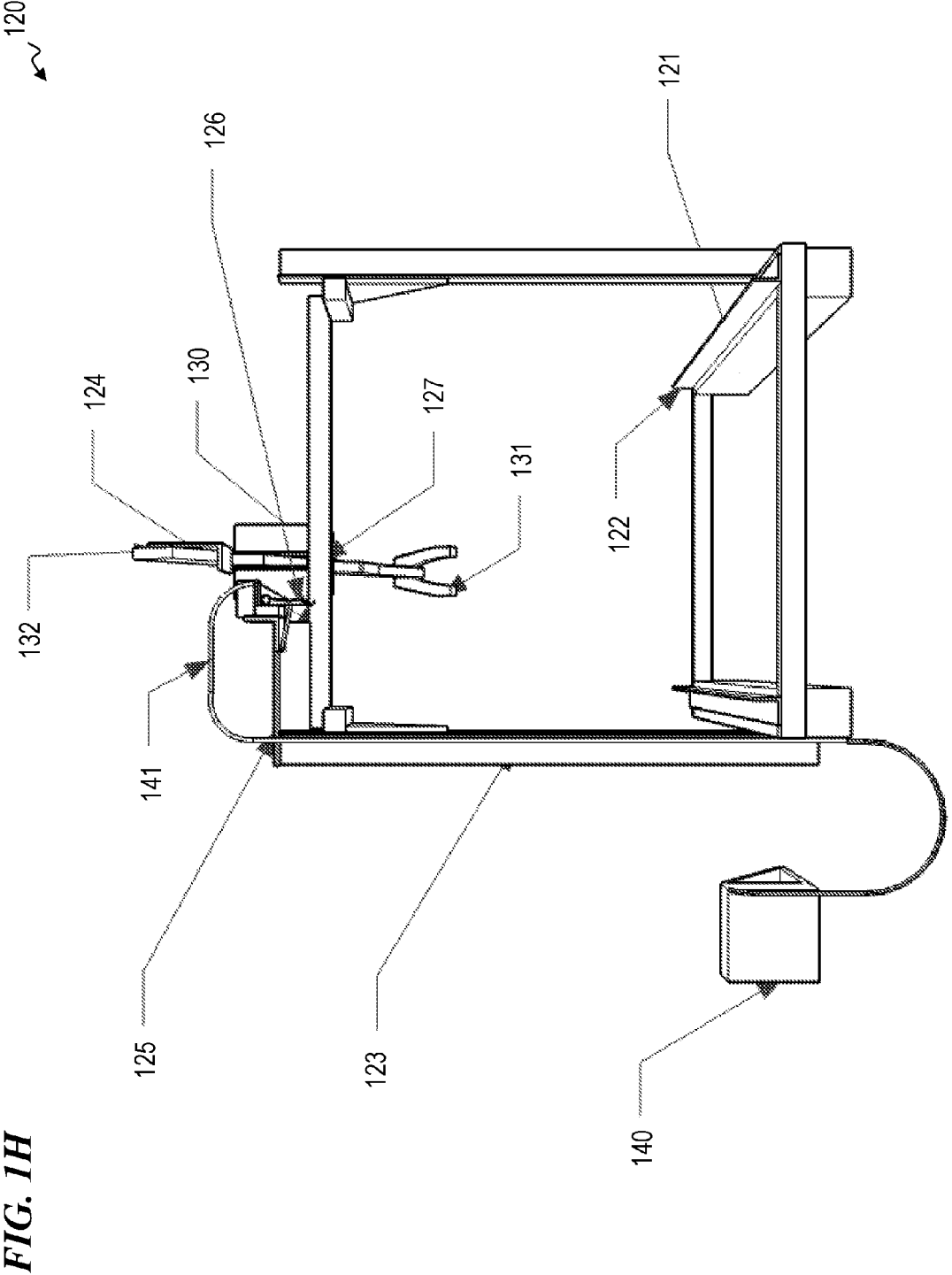
FIG. 1H is a perspective back view of upper unit 120 of saw-mount system 101, according to some embodiments of the present invention.

FIG. 1H is a perspective back view of upper unit 120 of saw-mount system 101, according to some embodiments of the present invention.

Figure 1I:
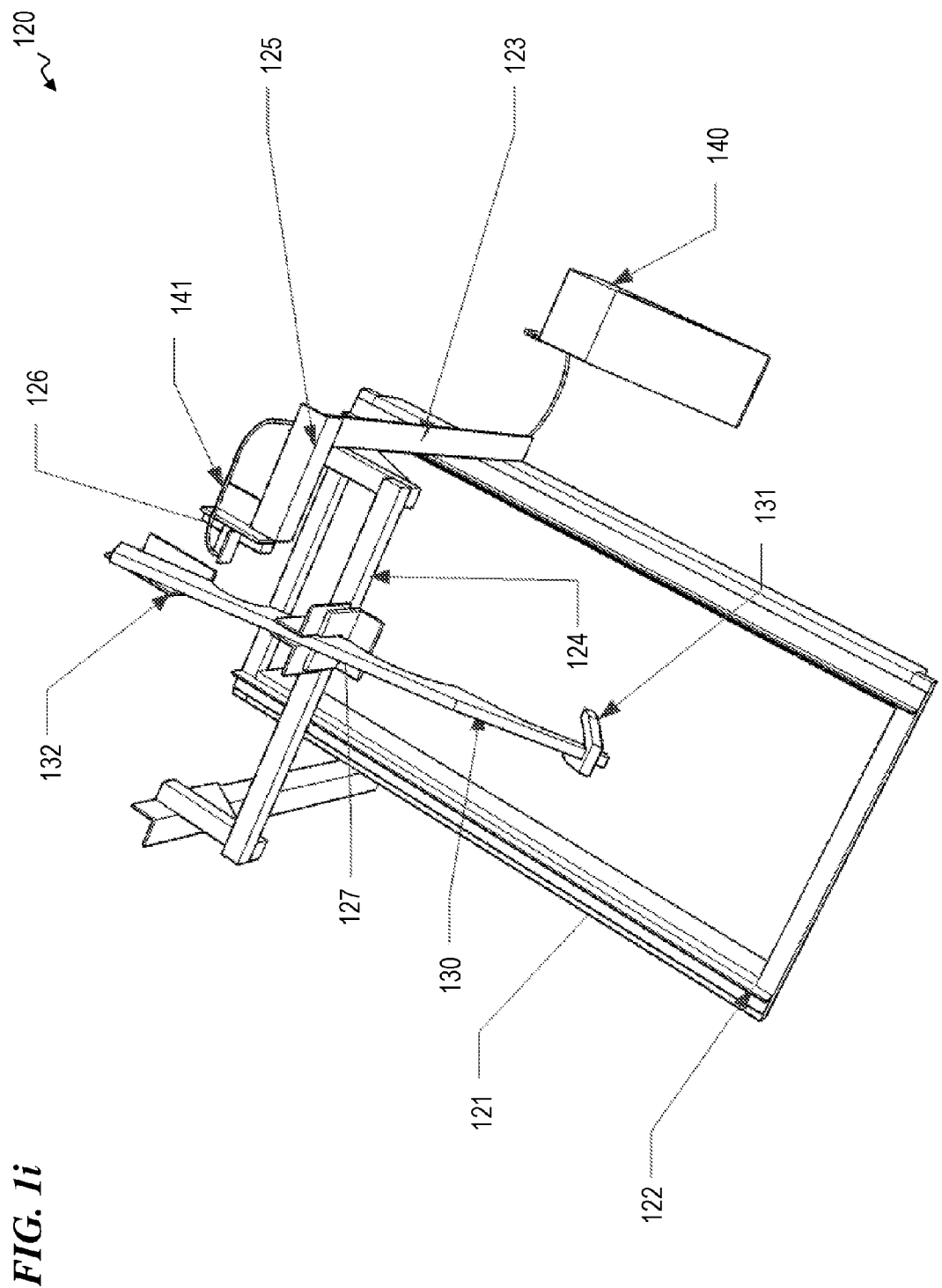
FIG. 1*i* is a first perspective top view of upper unit 120 of saw-mount system 101, according to some embodiments of the present invention.

FIG. 1i is a first perspective top view of upper unit 120 of saw-mount system 101, according to some embodiments of the present invention.

Figure 1J:
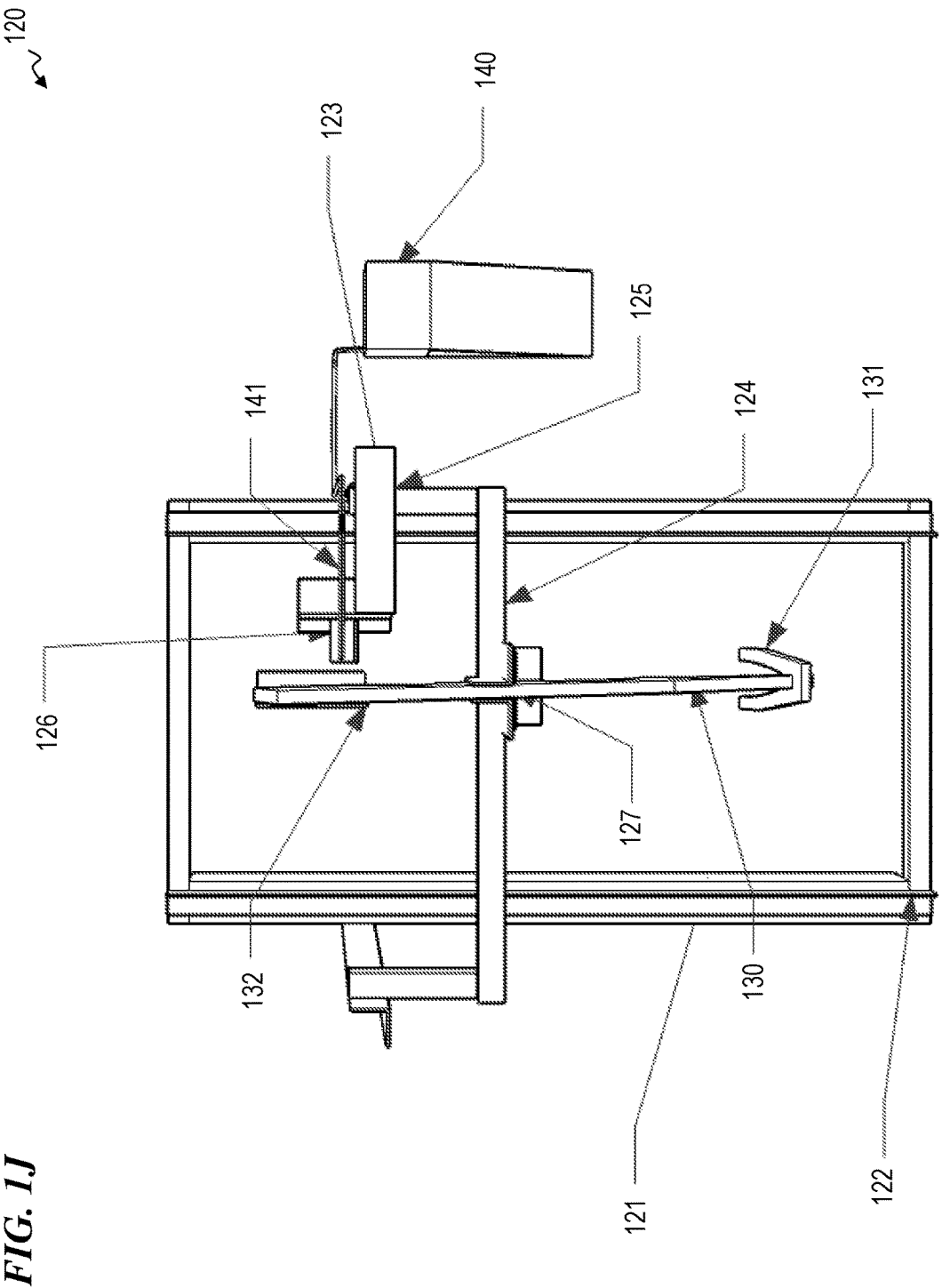
FIG. 1J is a second perspective top view of upper unit 120 of saw-mount system 101, according to some embodiments of the present invention.

FIG. 1J is a second perspective top view of upper unit 120 of saw-mount system 101, according to some embodiments of the present invention.

Figure 1K:
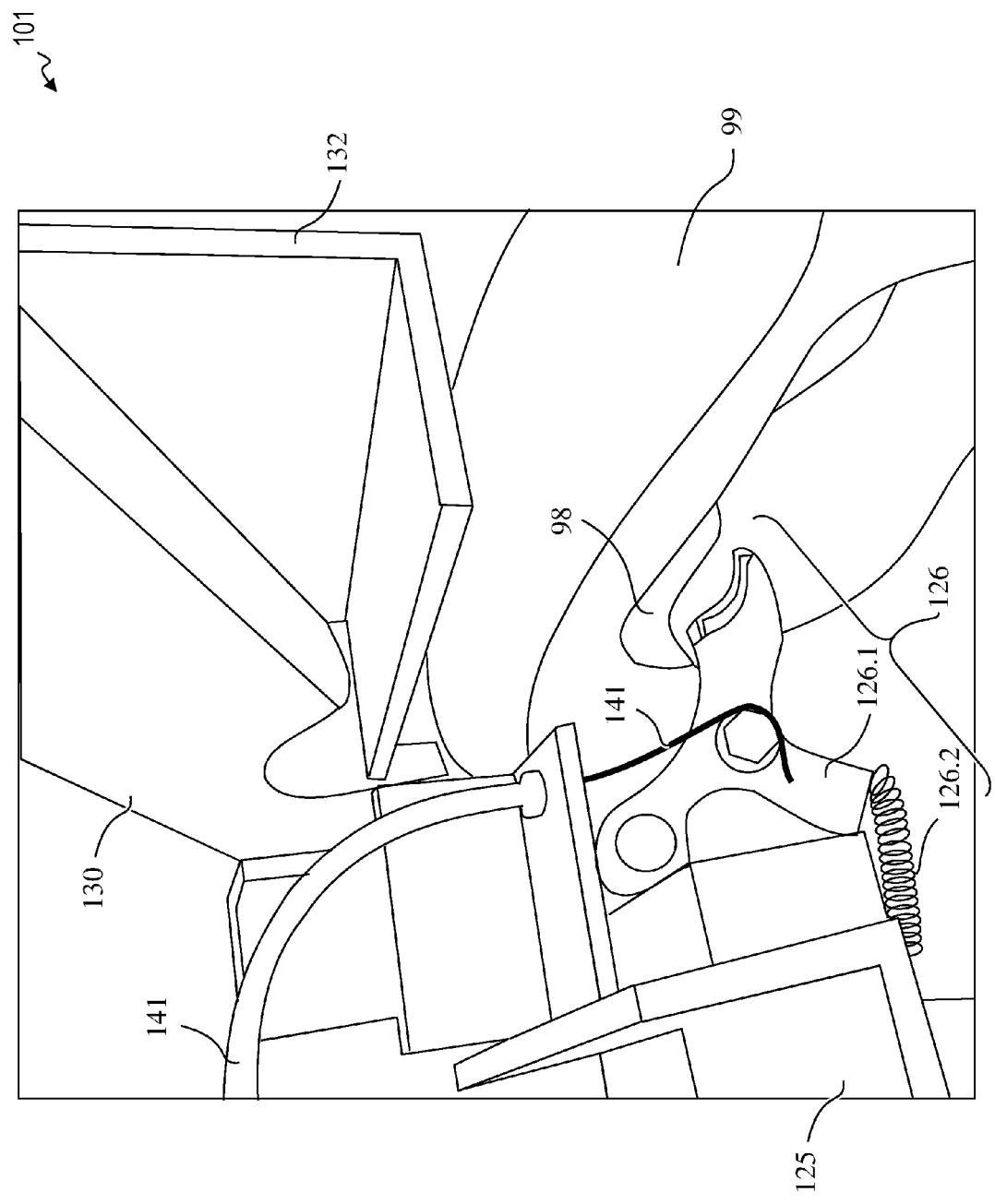
FIG. 1K is a magnified perspective view of system 101 showing trigger mechanism 126 engaging the throttle button 98 on a cut-off saw 99, according to some embodiments of the present invention.

FIG. 1K is a magnified perspective view of system 101 showing trigger mechanism 126 engaging the throttle button 98 on a cut-off saw 99, according to some embodiments of the present invention. In some embodiments, trigger mechanism 126 includes a trigger press 126.1 and a spring 126.2. In some embodiments, trigger mechanism 126 (in combination with throttle mechanism 140 and connector 141) works in a manner similar to a bicycle brake line in that depression of the foot peddle in mechanism 140 pulls the cable 141 such that trigger press 126.1 engages the throttle button 98 of the mounted saw 99. In some such embodiments, spring 126.2 provides a "disengaged" default position for trigger press 126.1 (i.e., in some embodiments, the default position for trigger mechanism 126 is that the throttle button 98 of saw 99 is not engaged by trigger press 126.1 and thus saw 99 remains off). In some embodiments, trigger press 126.1 includes a vice-style device that allows the sensitivity of trigger press 126.1 to be adjusted (e.g., in some embodiments, tightening or loosening a screw coupled to trigger press 126.1 adjusts the extent to which trigger press 126.1 engages throttle button 98 of saw 99 when throttle mechanism 140 is activated).

Figure 2A:
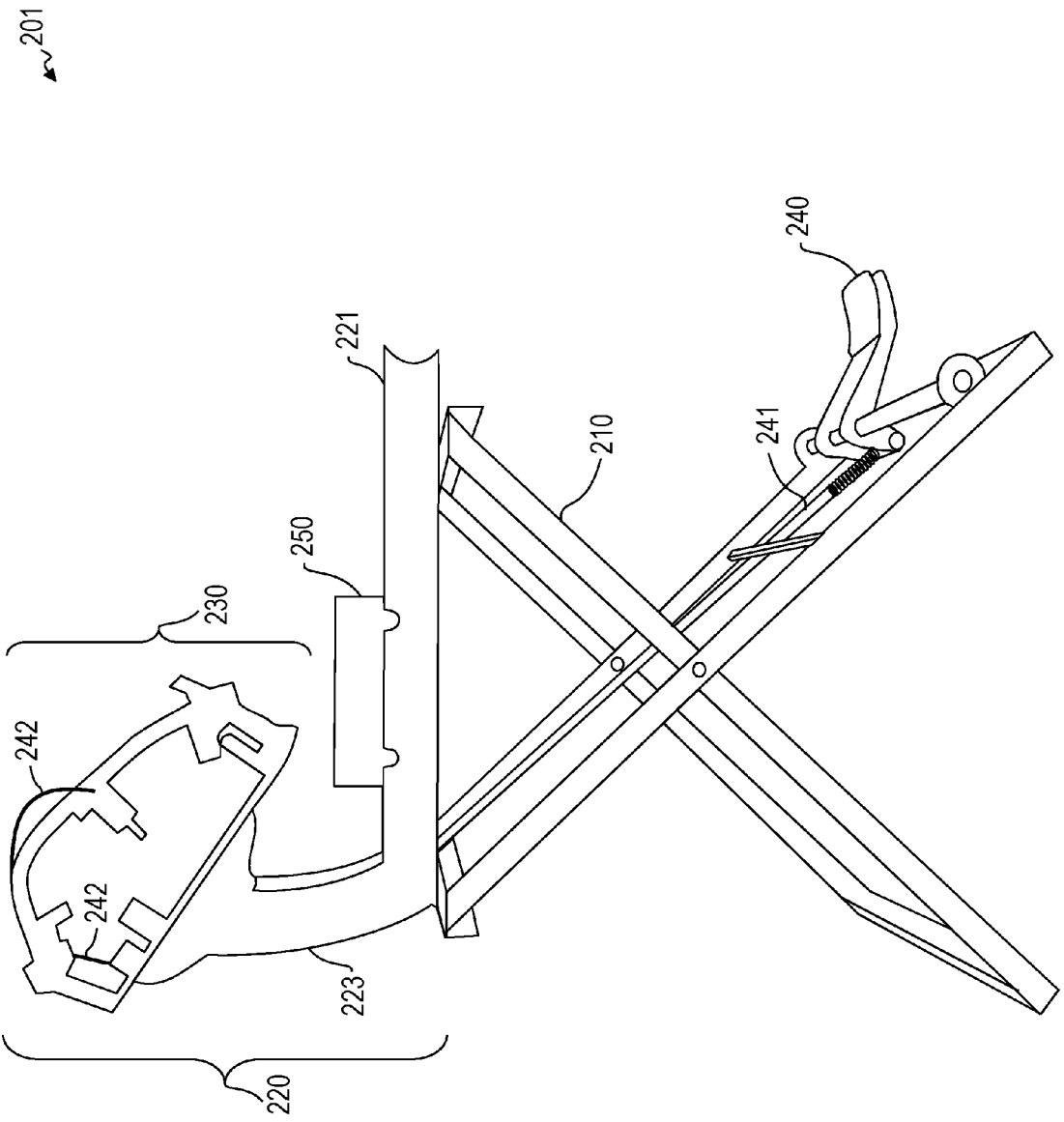
FIG. 2A is a perspective first-side view of a saw-mount system 201, according to some embodiments of the present invention.

FIG. 2A is a perspective first-side view of a saw-mount system 201, according to some embodiments of the present invention. System 201 is sometimes referred to herein as the Diamond Back™ saw mount. In some embodiments, system 201 is configured to provide a portable assembly for mounting a power saw such as a cut-off saw (e.g., a TS 420 Stihl Cutquick® cut-off saw (www.stihlusa.com/products/cut-off-machines), a Husqvarna® K 760 power cutter (www.husqvarna.com/us/construction/products/power-cutters-product-range/k-760), or the like). In some embodiments, system 201 is compatible with saws and/or blades for cutting non-masonry materials such as metal. In some embodiments, system 201 includes a mount unit 220 and a stand 210 that are configured to be removably connected to each other. In some embodiments, stand 210 is foldable for easy transport. In some embodiments, mount unit 220 includes a base 221, a neck 223, and a saw housing 230. In some embodiments, base 221 is configured to couple to a work table 250 such that the work table 250 can slide along the base 221 (e.g., in some such embodiments, base 221 includes an I-beam and table 250 is configured to slide along the I-beam). In some embodiments, system 201 includes a throttle mechanism 240 operably coupled to stand 210 and mount unit 220 (in some such embodiments, throttle mechanism 240 includes a foot pedal that is integrated with stand 210 and operatively coupled to saw housing 230 via connector 241 and cable 242; in other such embodiments, throttle mechanism 240 includes any other suitable hands-free controller such as a foot-controlled dial, slide, button, or other similar device). In some embodiments, throttle mechanism 240 (e.g., a foot pedal) is kept in a neutral position by a spring.

Figure 2B:
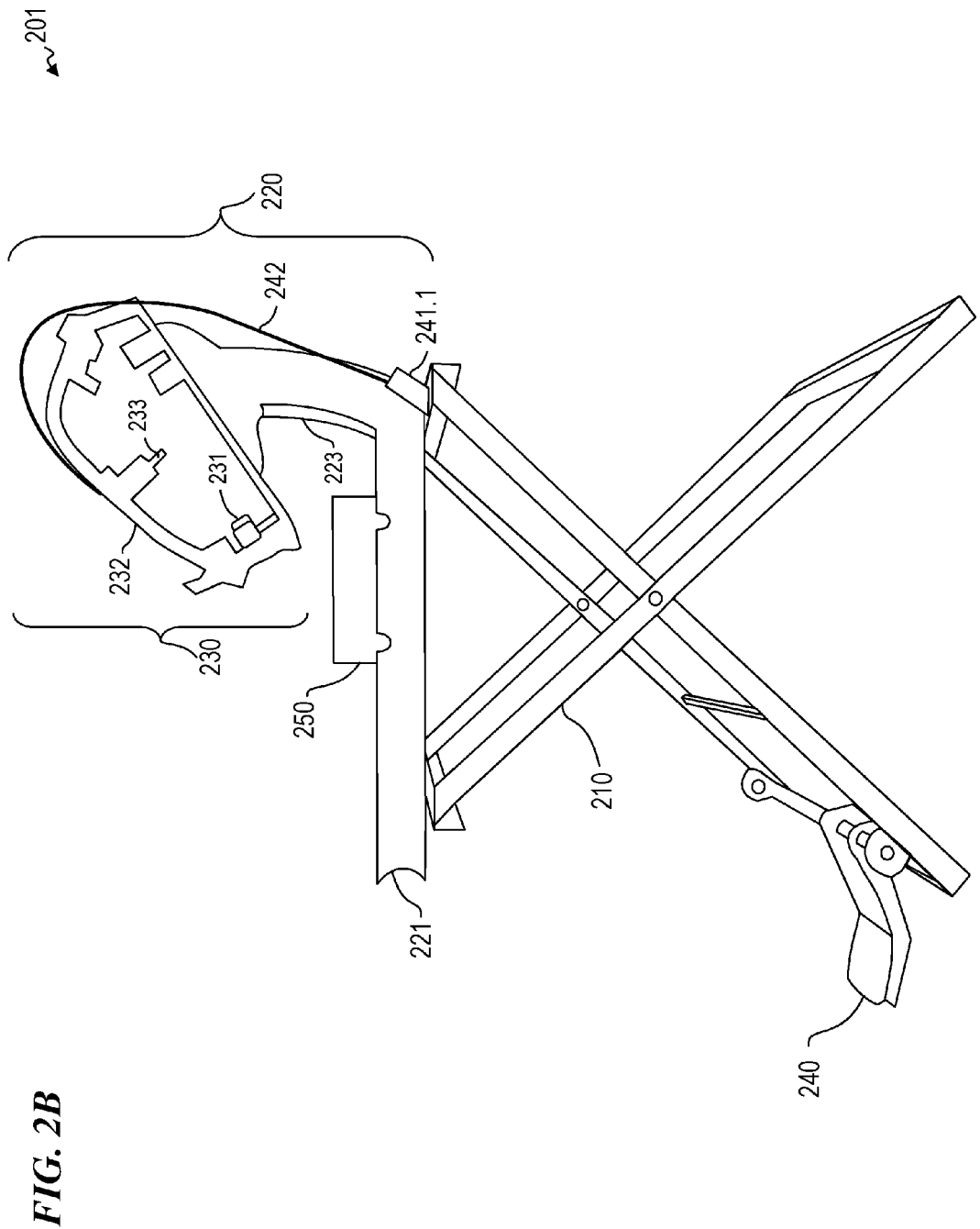
FIG. 2B is a perspective second-side view of saw-mount system 201, according to some embodiments of the present invention.

FIG. 2B is a perspective second-side view of saw-mount system 201, according to some embodiments of the present invention. In some embodiments, saw housing 230 includes a mount assembly 232, and in some such embodiments, mount assembly 232 is the structure shown in FIG. 5 of Von Siegroth, et al., which is described and incorporated herein by reference above. In some embodiments, saw housing 230 includes any other suitable structure for mounting saw 99 to system 201 such that saw 99 can be safely used (e.g., in some such embodiments, saw housing 230 includes arm 130 instead of assembly 232). In some embodiments, mount assembly 232 is modified to include exhaust-deflection mechanism 231. In some embodiments, exhaust-deflection mechanism 231 is coupled to mount assembly 232 in a position where the exhaust from the saw will be outputted when the saw is mounted to assembly 232 (e.g., in some embodiments, mechanism 231 is mounted on the left side of assembly 232 if facing toward the "front" or blade side of assembly 232). In some embodiments, mechanism 231 includes a channel that directs exhaust to the side of the mounted saw, rather than straight forward toward the user of system 201. In some embodiments, mechanism 231 is bolted to assembly 232. In some embodiments, mechanism 231 is coupled to assembly 232 in any other suitable manner (e.g., welded). In some embodiments, connection mechanism 241.1 mechanically couples cable 242 to connector 241 (connector 241 cannot be seen in FIG. 2B; see FIG. 2A for view of connector 241).

In some embodiments, system 201 is constructed of a material such as aluminum. In some embodiments, system 201 is constructed of any other suitable material such as steel, fiberglass, carbon fiber, or the like. In some embodiments, system 201 includes a light (e.g., a light-emitting-diode (LED) fixture or the like) coupled to mount unit 220 to provide for low-light cutting operations. In some embodiments, system 201 includes wheels or castors to assist with the portability of system 201.

Figure 2C:
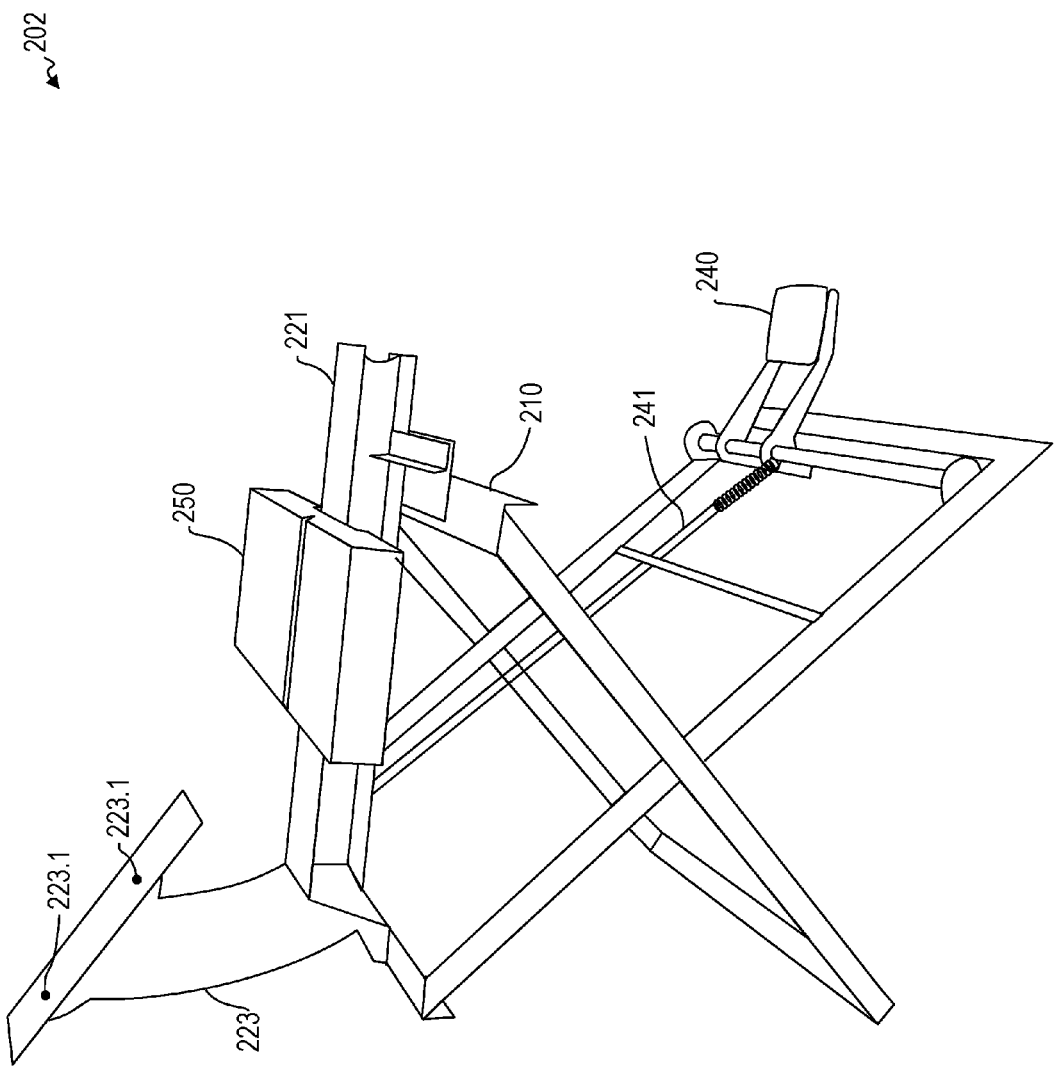
FIG. 2C is a perspective view of a saw-mount system 202, according to some embodiments of the present invention.

FIG. 2C is a perspective view of a saw-mount system 202, according to some embodiments of the present invention. In some embodiments, saw-mount system 202 is substantially similar to system 201, except that there is no saw housing 230 shown on saw-mount system 202. In some embodiments, neck 223 includes a connection plate that has holes 223.1 for connecting saw housing 230 to neck 223 (e.g., in some such embodiments, nuts and bolts are used to connect the bottom portion of housing 230 to neck 223 via holes 223.1).

Figure 2D:
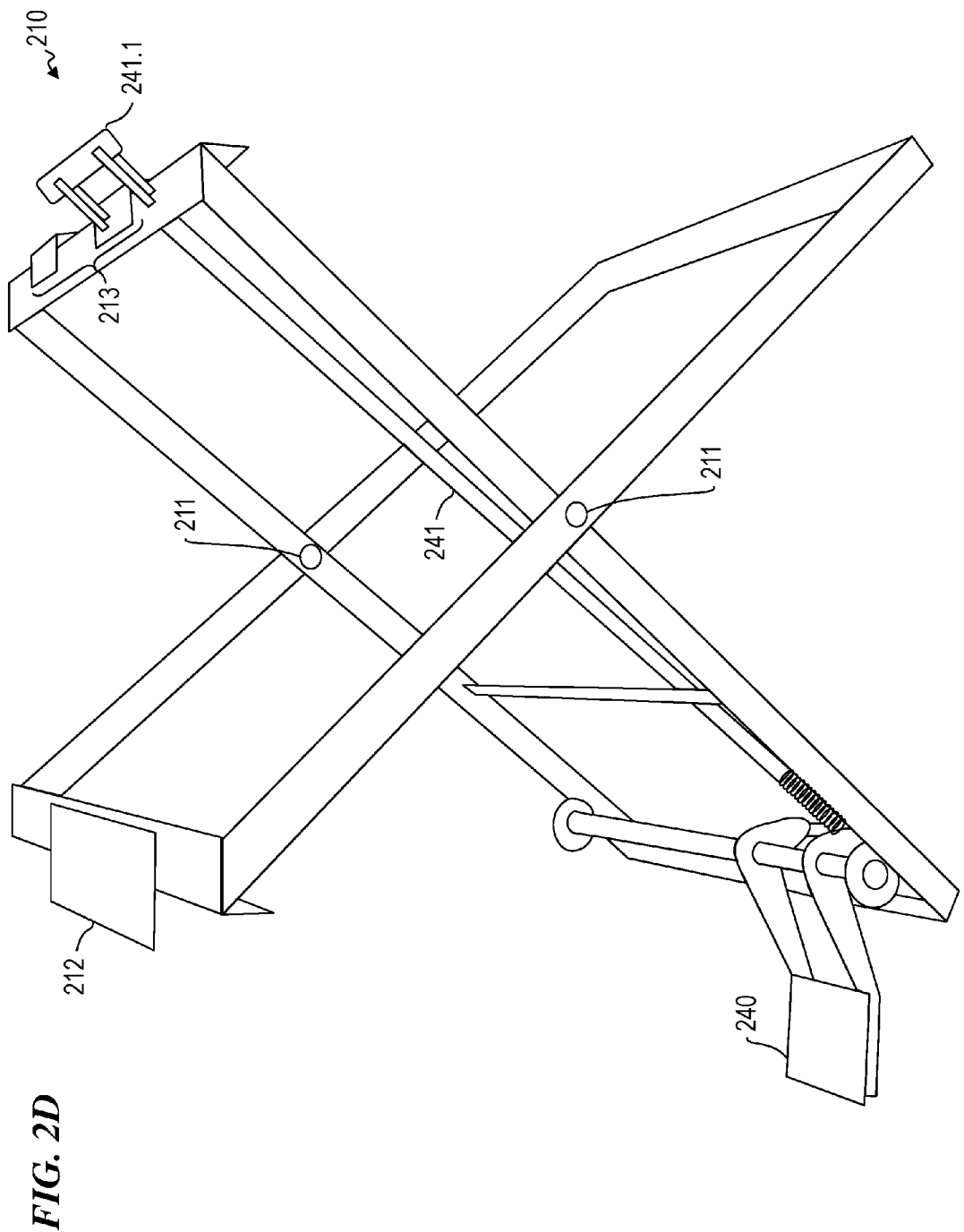
FIG. 2D is a perspective side view of stand 210, according to some embodiments of the present invention.

FIG. 2D is a perspective side view of stand 210, according to some embodiments of the present invention. In some embodiments, stand 210 includes a front connector 212 and a rear connector 213 that are both configured to couple mount unit 220 to stand 210. In some embodiments, stand 210 is foldable via hinges 211. In some embodiments, front connector 212 includes a connector plate with holes that are configured to line up with corresponding holes on a front portion of mount unit 220 (in some such embodiments, the front portion of mount unit 220 and front connector 212 are connected to each other using thumb screws or the like). In some embodiments, rear connector 213 includes one or more receiving plates configured to receive a rear portion of mount unit 220 by sliding the rear portion of mount unit 220 into the receiving plates (in some such embodiments, the one or more receiving plates form a lip under which the rear portion of mount unit 220 is placed). In some embodiments, connector 241 includes a spring-loaded rod or the like that is pushed toward the top of stand 210 when throttle mechanism 240 (e.g., a foot pedal) is depressed.

Figure 2E:
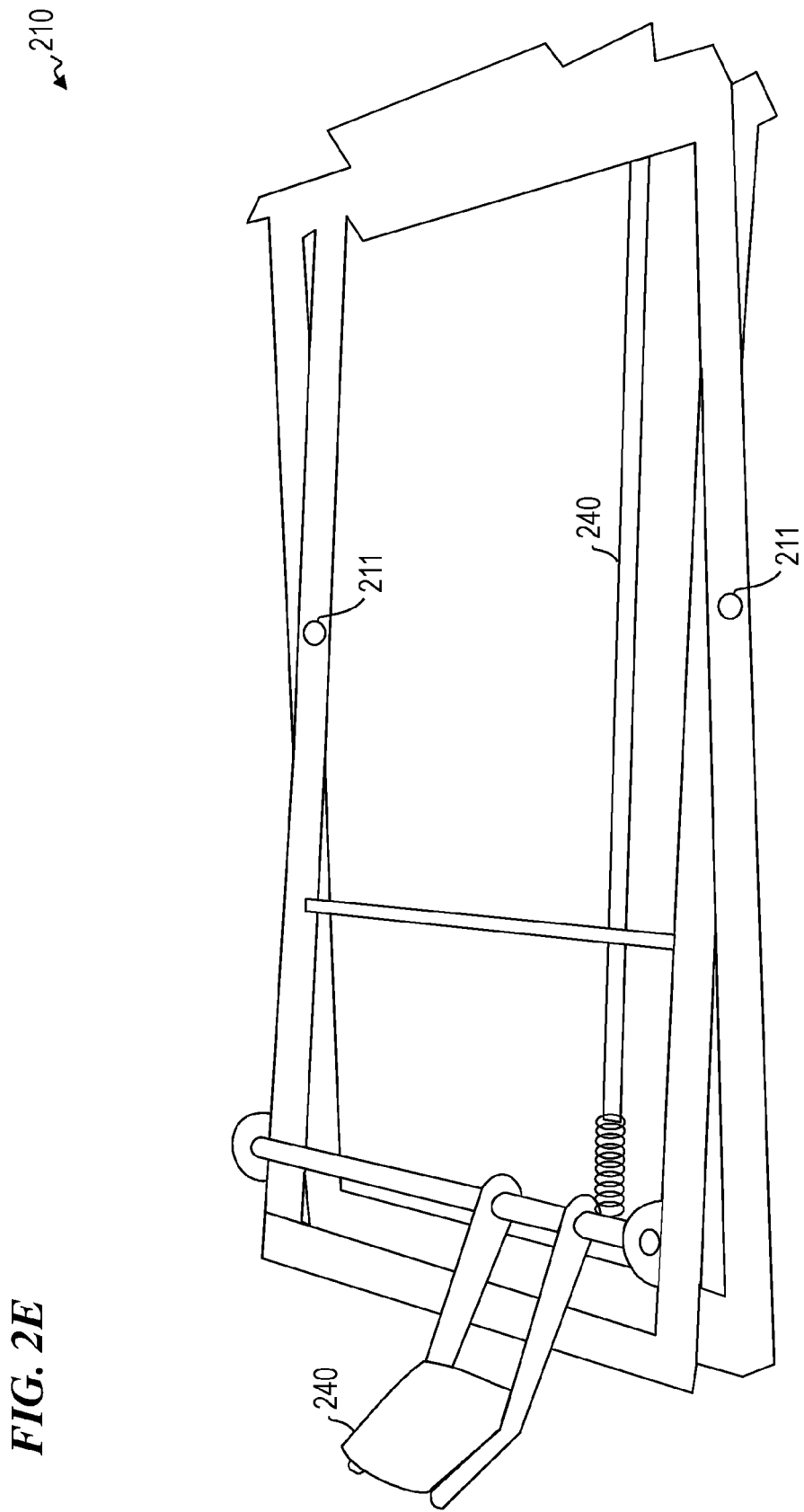
FIG. 2E is a perspective view of stand 210 in a folded position, according to some embodiments of the present invention.

FIG. 2E is a perspective view of stand 210 in a folded position, according to some embodiments of the present invention.

Figure 2F:
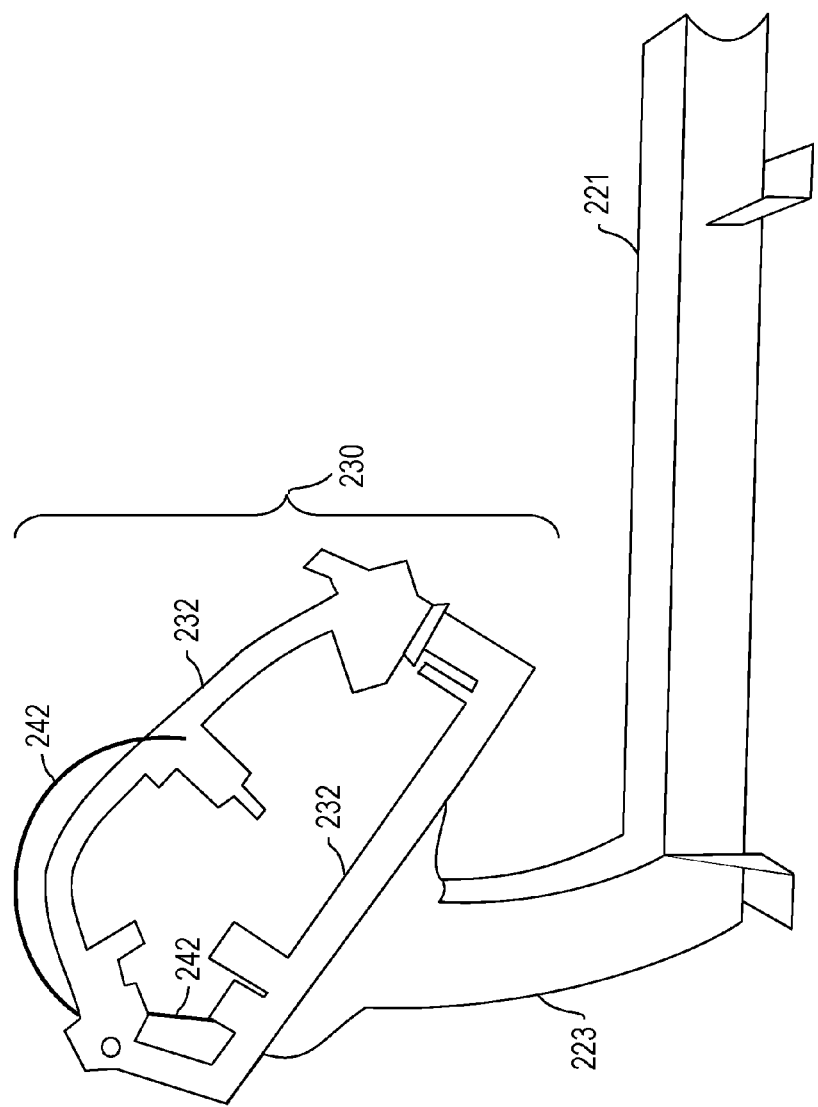
FIG. 2F is a perspective side view of mount unit 220 with saw housing 230 in a closed position, according to some embodiments of the present invention.

FIG. 2F is a perspective side view of mount unit 220 with saw housing 230 in a closed position, according to some embodiments of the present invention.

Figure 2G:
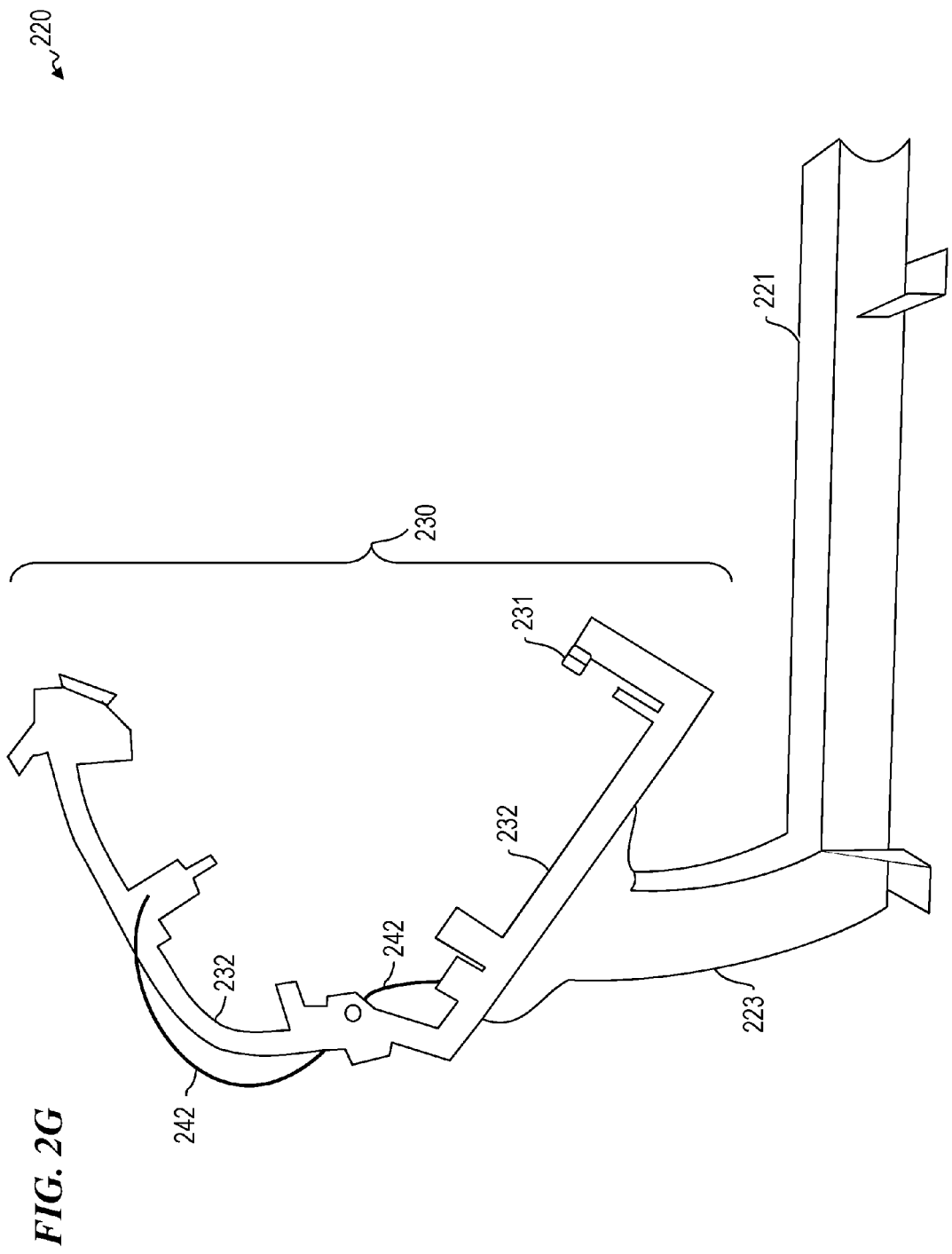
FIG. 2G is a perspective side view of mount unit 220 with saw housing 230 in an open position, according to some embodiments of the present invention.

FIG. 2G is a perspective side view of mount unit 220 with saw housing 230 in an open position, according to some embodiments of the present invention. In some embodiments, in order to mount a saw 99 to saw housing 230, mount assembly 232 is opened as shown in FIG. 2G, saw 99 is placed on assembly 232, and then assembly 232 is re-closed around saw 99.

Figure 2H:
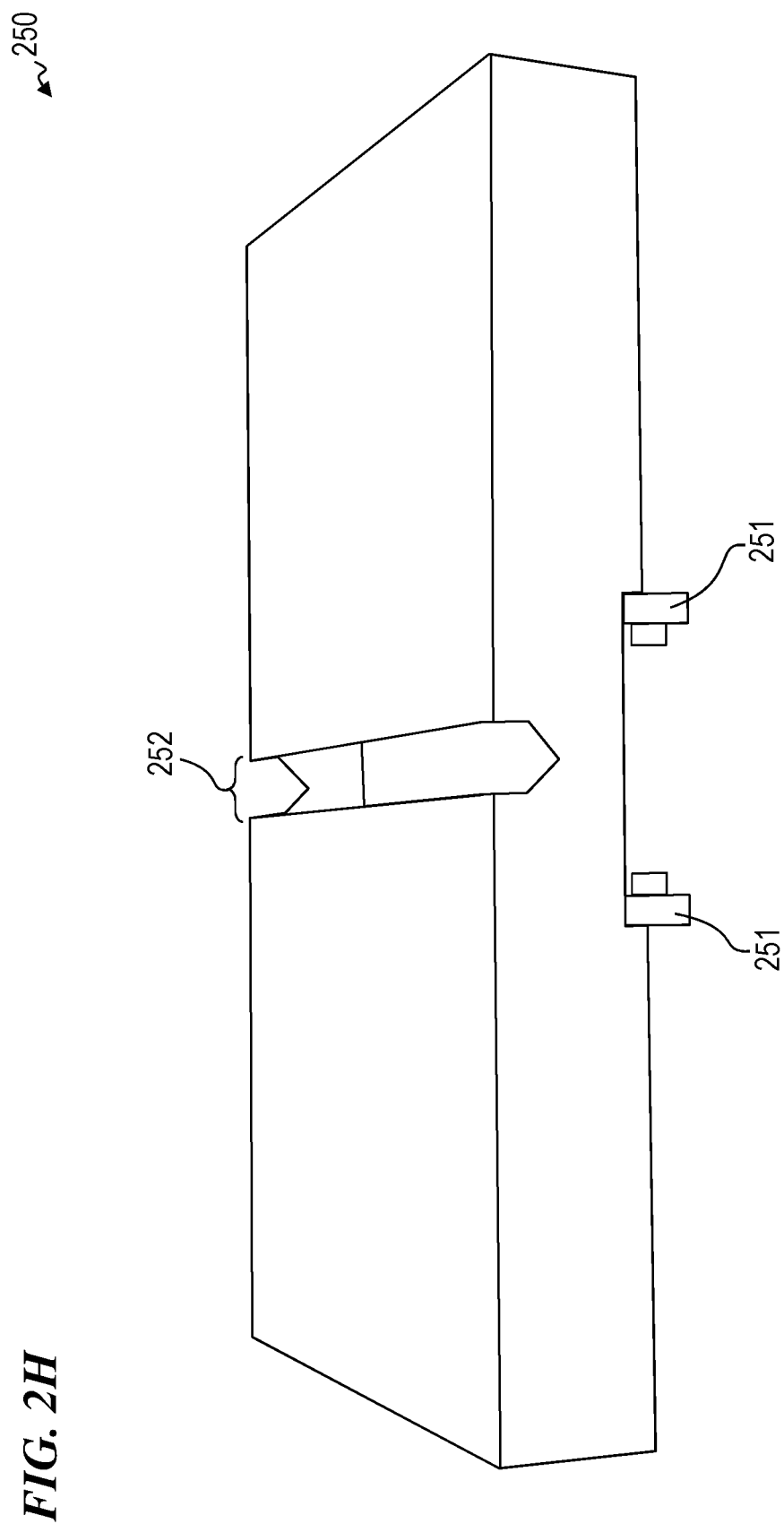
FIG. 2H is a perspective top view of work table 250, according to some embodiments of the present invention.

FIG. 2H is a perspective top view of work table 250, according to some embodiments of the present invention. In some embodiments, table 250 includes a sliding mechanism 251 configured to couple table 250 to base 221 and allow table 250 to be slid along base 221 during a cut operation. In some embodiments, table 250 includes a blade groove 252 configured to provide a space for the blade of a mounted saw to pass through as table 250 is moved along base 221 during the cut operation.

Figure 2I:
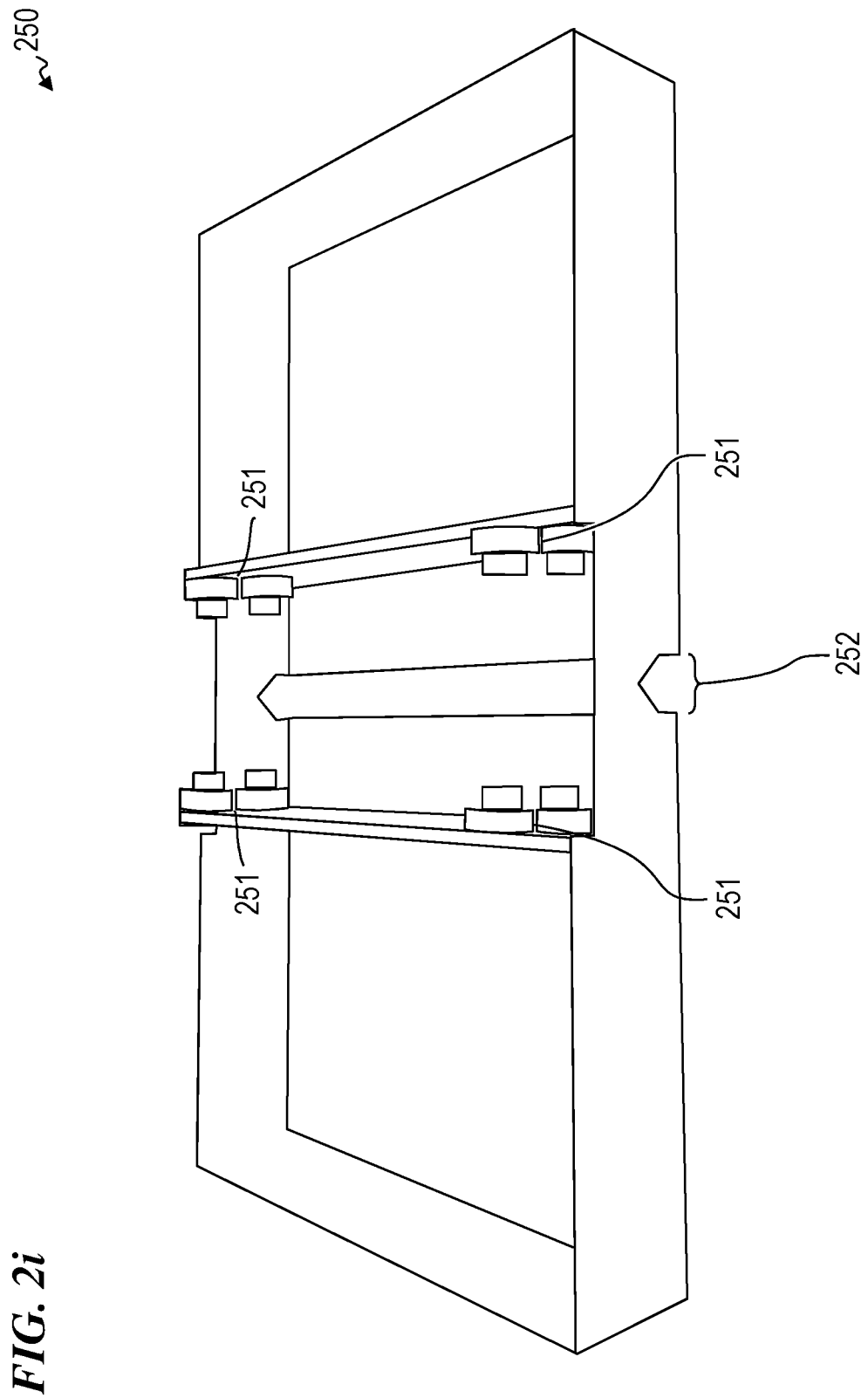
FIG. 2*i* is a perspective bottom view of work table 250, according to some embodiments of the present invention.

FIG. 2i is a perspective bottom view of work table 250, according to some embodiments of the present invention. In some embodiments, sliding mechanism 251 includes a plurality of wheel or roller pairs that are configured to movably attach to base 221 (e.g., in some embodiments, base 221 includes an I-beam and sliding mechanism 251 includes four pairs of rollers 251.1 (e.g., wheels, casters, v-groove wheels/casters, or the like), and each pair of rollers is configured to sandwich around the upper horizontal plate of the I-beam such that table 250 can be slid along the I-beam during a cut operation).

Figure 2J:
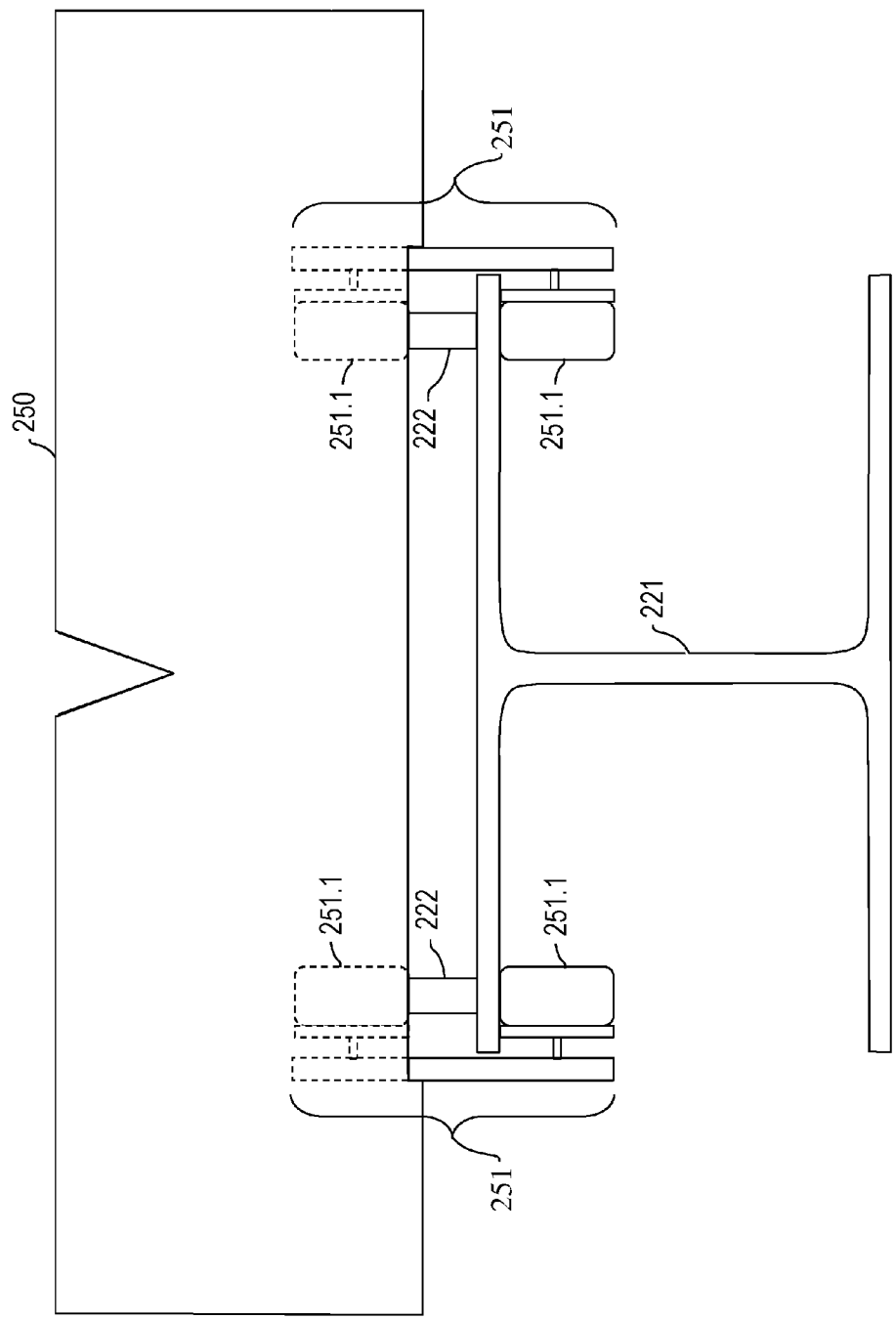
FIG. 2J is a partial front view of system 201 showing base 221 with rails 222 located on a top surface of base 221, according to some embodiments of the present invention.

FIG. 2J is a partial front view of system 201 showing base 221 with rails 222 located on a top surface of base 221, according to some embodiments of the present invention. In some embodiments, sliding mechanism 251 of table 250 includes four pairs of rollers (only the front two pairs of rollers are visible in FIG. 2J) that are spaced apart such that one roller 251.1 of each respective pair of rollers moves along a respective one of the rails 222 and the other roller 251.1 of the respective pair or rollers moves along the bottom surface of base 221 directly below the respective rail 222.

Figure 2K:
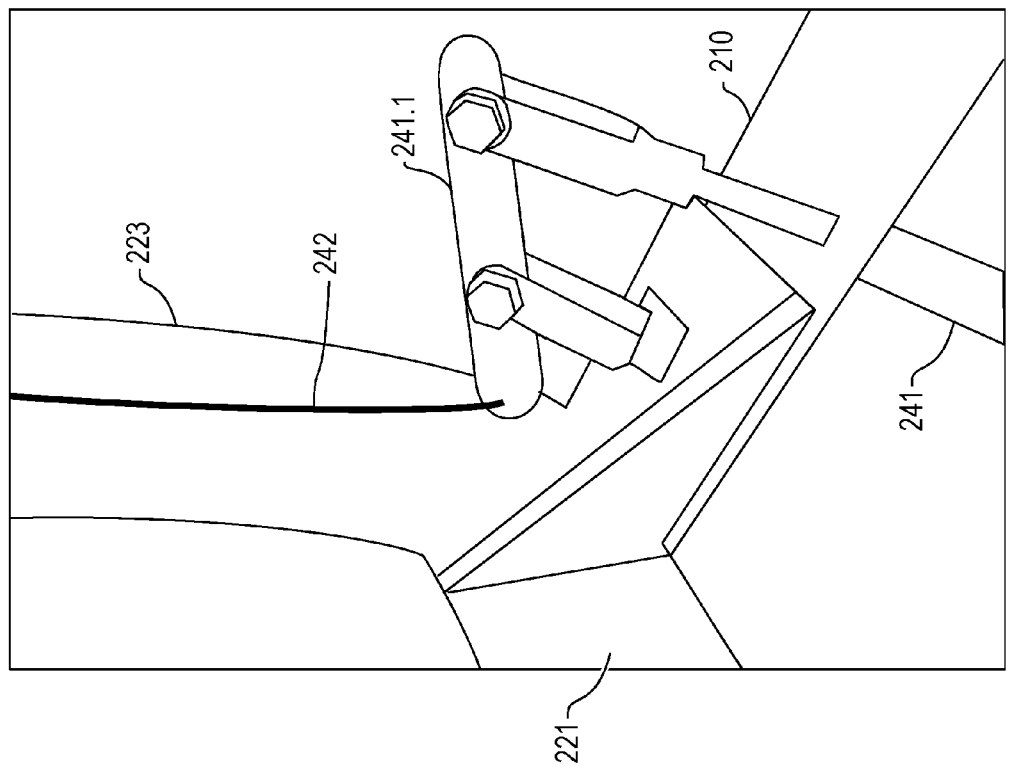
FIG. 2K is a magnified perspective view of saw-mount system 201 showing a connection mechanism 241.1 in an activated position, according to some embodiments of the present invention.

FIG. 2K is a magnified perspective view of saw-mount system 201 showing a connection mechanism 241.1 in an activated position, according to some embodiments of the present invention. In some embodiments, connection mechanism 241.1 mechanically couples cable 242 to connector 241. In some embodiments, connector 241 is a rod or bar that is connected to throttle mechanism 240 at a first end of connector 241 and connected to a first side of a connection mechanism 241.1 at a second, opposite end of connector 241. In some embodiments, cable 242 is connected to a second side of connection mechanism 241.1. In some embodiments, when throttle mechanism 240 (e.g., a foot pedal) is depressed, connector 241 is pushed toward the top of stand 210, which in turn pushes the first side of connection mechanism 241.1 upwards (see FIG. 2K), which in turn pulls the second side of connection mechanism 241.1 (and the attached cable 242) downward. In some such embodiments, when cable 242 is pulled down, trigger press 233 (see, e.g., FIG. 2B and FIG. 2N) is engaged such that the throttle button 98 of the mounted saw 99 is depressed/activated.

Figure 2L:
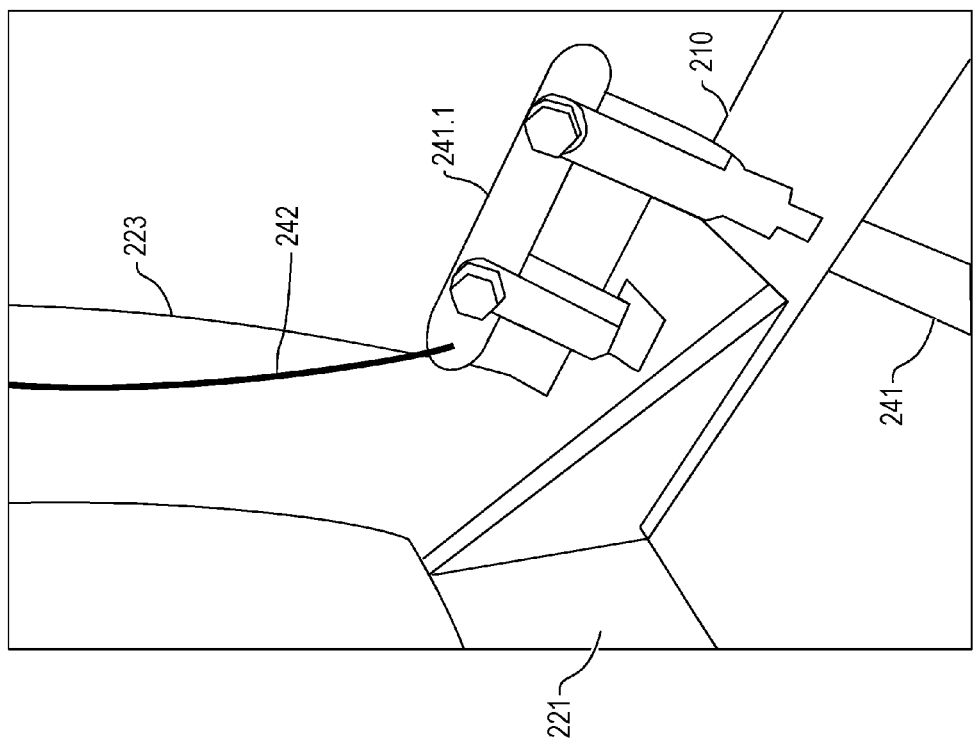
FIG. 2L is a magnified perspective view of saw-mount system 201 showing connection mechanism 241.1 in a rest position, according to some embodiments of the present invention.

FIG. 2L is a magnified perspective view of saw-mount system 201 showing connection mechanism 241.1 in a rest position, according to some embodiments of the present invention.

Figure 2M:
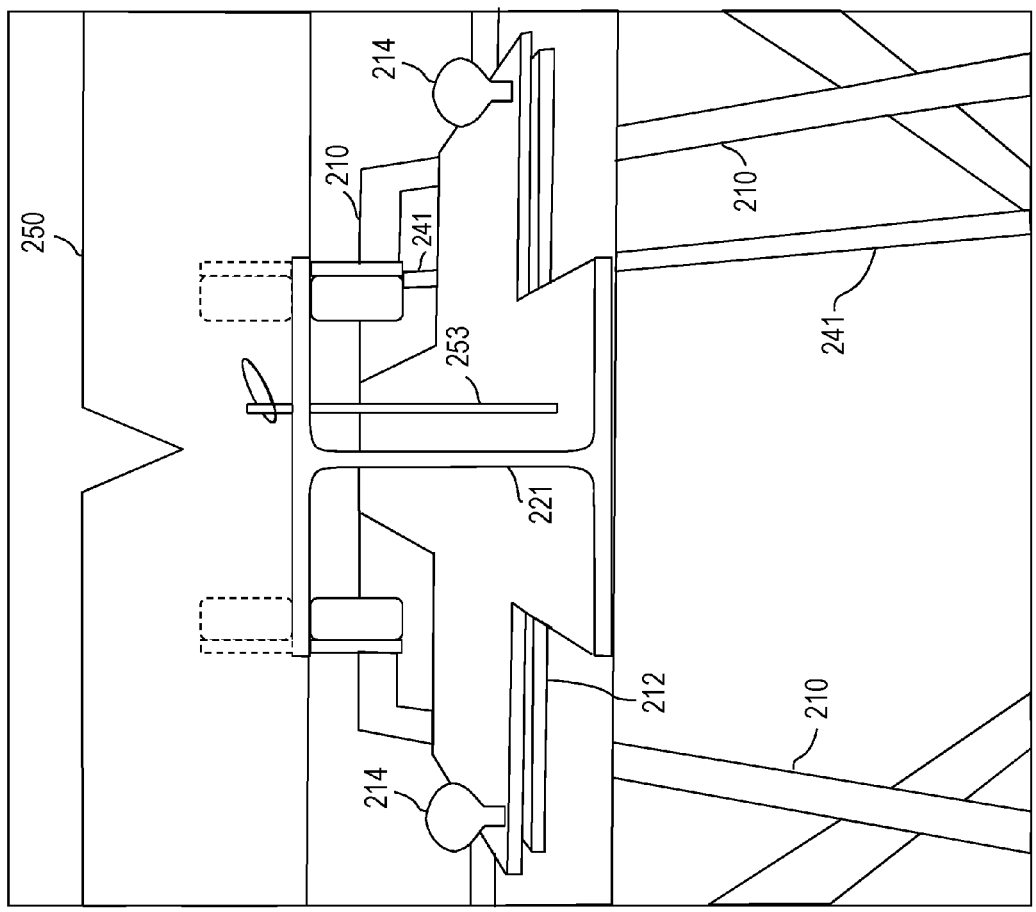
FIG. 2M is a magnified perspective front view of saw-mount system 201 showing connections between mount unit 220 and stand 210, according to some embodiments of the present invention.

FIG. 2M is a magnified perspective front view of saw-mount system 201 showing connections between mount unit 220 and stand 210, according to some embodiments of the present invention. In some embodiments, the front portion of base 221 and front connector 212 of stand 210 are connected to each other using thumb screws 214. In some embodiments, mount unit 221 and stand 210 are connected to each other using any other suitable means (e.g., nuts and bolts, clamps, etc.). In some embodiments, base 221 includes a hole for receiving a table-stop pin 253 that is configured to provide a stop for table 250 such that table 250 cannot slide off of base 221 during use.

Figure 2N:
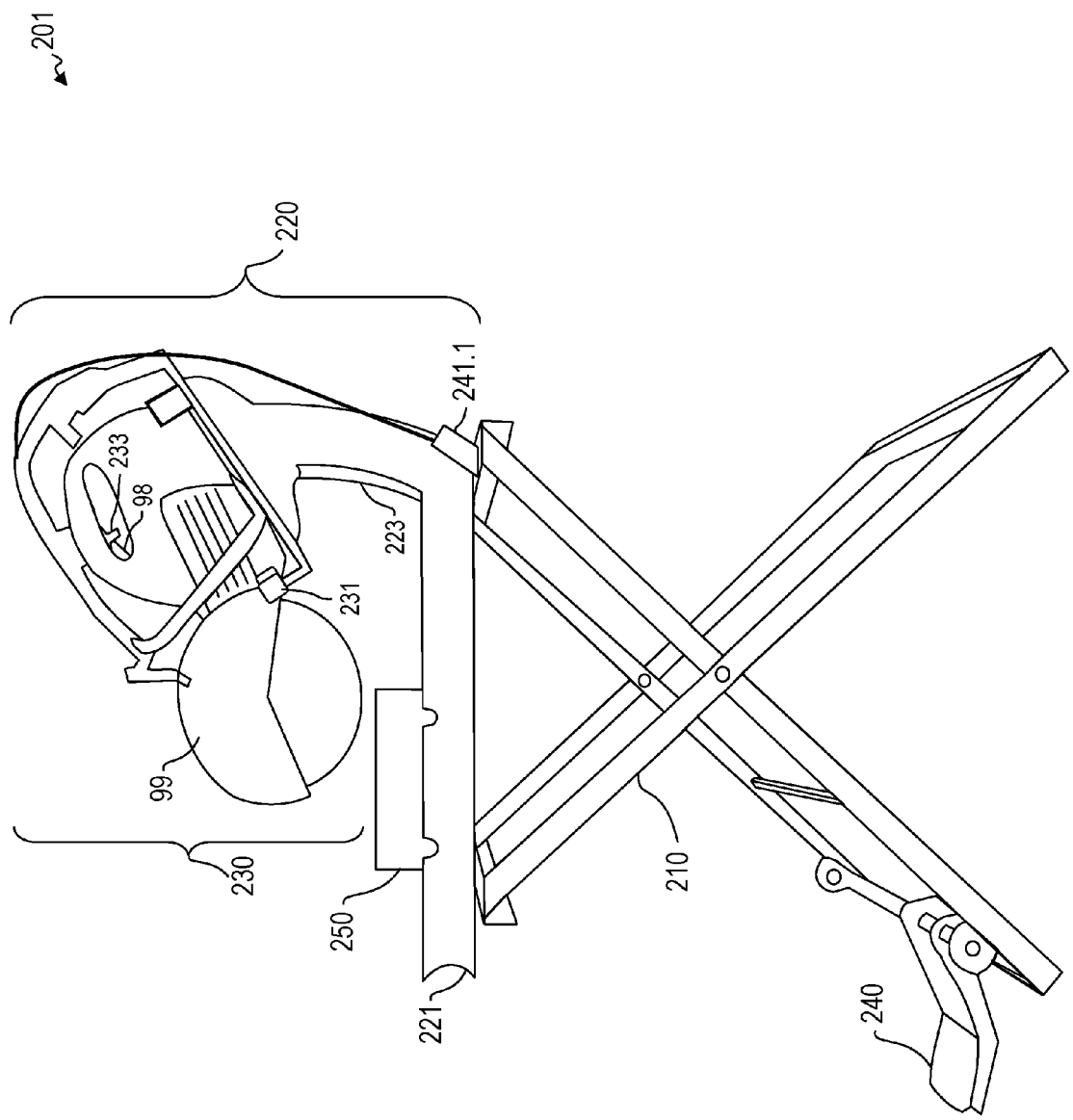
FIG. 2N is a perspective side view of saw-mount system 201 with cut-off saw 99 mounted to system 201, according to some embodiments of the present invention.

FIG. 2N is a perspective side view of saw-mount system 201 with cut-off saw 99 mounted to system 201, according to some embodiments of the present invention. In some embodiments, a user of system 201 controls the throttle of saw 99 by using throttle mechanism 240 (in some such embodiments, depressing foot pedal 240 transfers the force necessary (via connector 241, connecting mechanism 241.1, and cable 242) to engage trigger press 233 and depress throttle button 98.

Figure 3A:
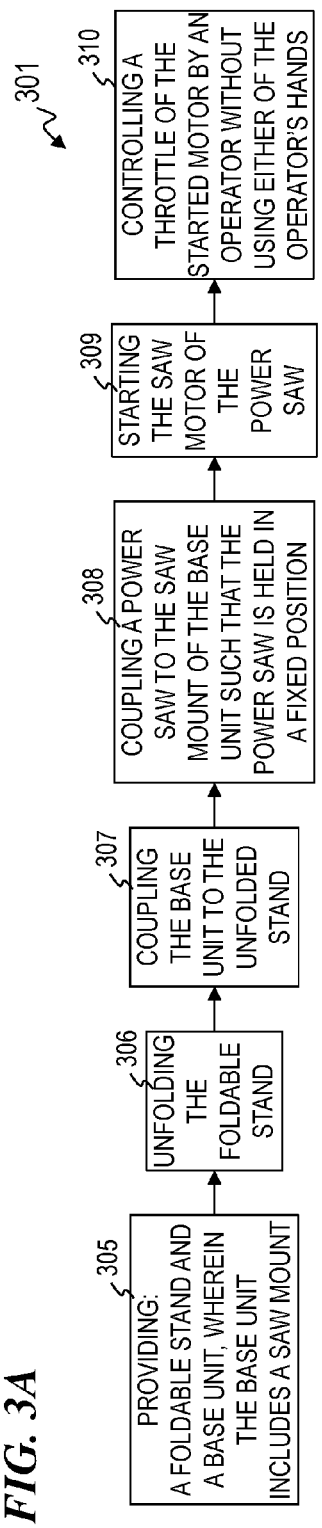
FIG. 3A is a flow chart 301 of a method for operating a hand-held power saw on a portable mount system described herein, according to some embodiments of the present invention.

FIG. 3A is a flow chart 301 of a method for operating a hand-held power saw on a portable mount system described herein, according to some embodiments of the present invention. In some embodiments, at block 305, the method includes providing: a foldable stand and a base unit, wherein the base unit includes a saw mount. In some embodiments, at block 306, the method includes unfolding the foldable stand. In some embodiments, at block 307, the method includes coupling the base unit to the unfolded stand. In some embodiments, at block 308, the method includes coupling a power saw to the saw mount of the base unit such that the power saw is held in a fixed position. In some embodiments, at block 309, the method includes starting the saw motor of the power saw. In some embodiments, at block 310, the method includes controlling a throttle of the started motor by an operator without using either of the operator's hands.

Figure 3B:
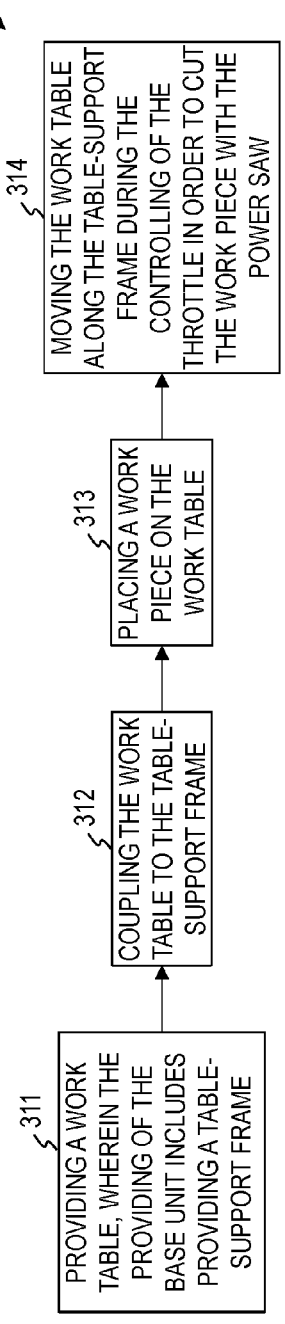
FIG. 3B is a flow chart 302 of a further method for operating the hand-held power saw on the portable mount system described herein, according to some embodiments of the present invention.

FIG. 3B is a flow chart 302 of a further method for operating the hand-held power saw on the portable mount system described herein, according to some embodiments of the present invention. In some embodiments, at block 311, the method further includes providing a work table, wherein the providing of the base unit includes providing a table-support frame. In some embodiments, at block 312, the method further includes coupling the work table to the table-support frame. In some embodiments, at block 313, the method further includes placing a work piece on the work table. In some embodiments, at block 314, the method further includes moving the work table along the table-support frame during the controlling of the throttle in order to cut the work piece with the power saw.

Figure 3C:
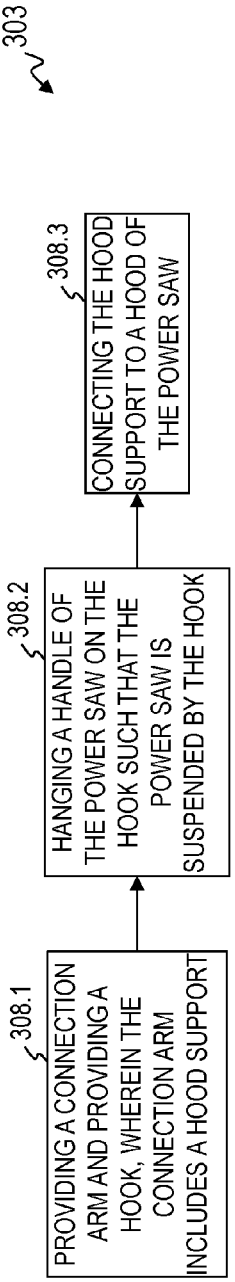
FIG. 3C is a flow chart 303 of a method for performing the coupling of the power saw to the saw mount shown in block 308 of FIG. 3A, according to some embodiments of the present invention.

FIG. 3C is a flow chart 303 of a method for performing the coupling of the power saw to the saw mount shown in block 308 of FIG. 3A, according to some embodiments of the present invention. In some embodiments, at block 308.1, the method includes providing a connection arm and providing a hook, wherein the connection arm includes a hood support. In some embodiments, at block 308.2, the method includes hanging a handle of the power saw on the hook such that the power saw is suspended by the hook. In some embodiments, at block 308.3, the method includes connecting the hood support to a hood of the power saw.

In some embodiments, the present invention provides a table-mounted stand that houses a hand-held masonry cut-off saw. In some embodiments, the stand provides a fixed mount that keeps the saw stationary while the operator is allowed to feed the work piece through the saw with both hands. In some embodiments, the stand is configured to mount and un-mount the saw without the need for separate tools. In some embodiments, the stand includes a throttle control that is activated via foot control, which allows for two-hand manipulation of the work piece being cut by the saw mounted on the stand. In some embodiments, the two-handed work-piece manipulation provided by the stand allows for precise curved and multi-angled cuts. In some embodiments, the stand is made of lightweight construction (e.g., aluminum) for ease of setup and mobilization.

In some embodiments, the present invention provides an apparatus for mounting a hand-held power saw that includes a frame base; an arm operatively coupled to the frame base, wherein the arm is configured to couple to the hand-held power saw in order to hold the hand-held power saw in a fixed position during a cut operation; and a hands-free throttle mechanism operatively coupled to the arm such that a throttle of the hand-held power saw, when mounted to the apparatus, is controllable during the cut operation. In some embodiments of the apparatus, the frame base includes a plurality of rails configured to connect to a work table such that the work table can be slid along the plurality of rails during the cut operation. In some embodiments, the hands-free throttle mechanism includes a foot pedal configured to activate the throttle mechanism.

In some embodiments, the present invention provides an apparatus for mounting a hand-held power saw that includes a foldable stand, and a mount unit configured to couple to the foldable stand, wherein the mount unit is further configured to couple to the hand-held power saw in order to hold the hand-held power saw in a fixed position during a cut operation, wherein the mount unit includes a saw housing, wherein the saw housing includes a platform and a connection arm, and wherein the apparatus further includes a hands-free throttle mechanism operatively coupled to the saw housing such that a throttle of the hand-held power saw, when mounted to the apparatus, is controllable during the cut operation.

In some embodiments of the apparatus, the saw housing further includes an exhaust deflection device configured to deflect exhaust away from the hand-held power saw during the cut operation. In some embodiments, the hands-free throttle mechanism includes a foot pedal integrated with the foldable stand and configured to activate the throttle mechanism. In some embodiments, the apparatus further includes a work table, wherein the mount unit further includes an I-beam base configured to connect to the work table such that the work table can be slid along the I-beam base during the cut operation.

In some embodiments, the present invention provides an apparatus for mounting a hand-held power saw, wherein the power saw includes a saw motor that has a throttle that is controlled by a throttle button on the power saw, the apparatus including a foldable stand; a base unit configured to removably couple to the foldable stand, wherein the base unit includes: a saw mount configured to removably couple to the power saw in order to hold the power saw in a fixed position during operation of the power saw, and a trigger mechanism configured to selectively engage the throttle button on the power saw; and a hands-free throttle controller operatively coupled to the trigger mechanism and configured to provide control of the throttle of the saw motor.

In some embodiments of the apparatus, wherein the saw mount further includes an exhaust-deflection device configured to deflect exhaust away from a blade end of the power saw during operation of the power saw.

In some embodiments of the apparatus, the hands-free throttle controller includes a foot pedal. In some embodiments, the hands-free throttle controller includes a foot pedal integrated with the foldable stand. In some embodiments, the hands-free throttle controller includes: a foot pedal integrated with the foldable stand; a connector rod having a first end and a second end, wherein the first end of the connector rod is coupled to the foot pedal; a cable having a first end and a second end, wherein the first end of the cable is coupled to the trigger mechanism; and a connection mechanism having a first side and a second side, wherein the first side of the connection mechanism is coupled to the second end of the connector rod, wherein the second side of the connection mechanism is coupled to the second end of the cable, wherein the connection mechanism is configured to transfer mechanical force from the connector rod to the cable such that when the foot pedal is depressed and the power saw is coupled to the saw mount, the connector rod is pushed toward the connection mechanism, which in turn pushes the first side of the connection mechanism upwards, which in turn pulls the second side of the connection mechanism and the cable downward, which causes the trigger mechanism to engage the throttle button on the power saw.

In some embodiments of the apparatus, the hands-free throttle controller includes: a foot pedal; and a hydraulic system operatively coupled to the foot pedal and to the trigger mechanism such that when the foot pedal is depressed and the power saw is coupled to the saw mount, hydraulic pressure generated by the hydraulic-control system causes the trigger mechanism to engage the throttle button on the power saw. In some embodiments, the trigger mechanism is a battery-powered servomotor-based mechanism, wherein the hands-free throttle controller includes: a foot pedal; and an electronic-control system operatively coupled to the foot pedal such that when the foot pedal is depressed and the power saw is coupled to the saw mount, a wireless signal is transmitted by the electronic-control system to the trigger mechanism to cause the trigger mechanism to engage the throttle button on the power saw.

In some embodiments of the apparatus, the saw mount further includes a trigger-release member that is configured to press and hold a trigger release of the power saw during operation of the power saw.

In some embodiments, the apparatus further includes a work table, wherein the base unit further includes a table-support frame configured to connect to the work table such that the work table can be moved along the table-support frame during operation of the power saw. In some embodiments, the apparatus further includes a work table, wherein the base unit further includes a table-support frame configured to connect to the work table such that the work table can be moved along the table-support frame during operation of the power saw, and wherein the work table includes a blade groove configured to provide space for a blade of the power saw to pass through as the work table is moved along the table-support frame during operation of the power saw. In some embodiments, the apparatus further includes a work table having a plurality of rollers on a bottom surface of the work table, wherein the base unit further includes a table-support frame having a plurality of rails on a top surface of the table-support frame, wherein the table-support frame is configured to connect to the work table such that the plurality of rollers of the work table can be moved along the plurality of rails of the table-support frame during operation of the power saw. In some embodiments, the apparatus further includes a work table that includes a plurality of pairs of rollers on a bottom surface of the work table, wherein the base unit further includes an I-beam table-support frame, wherein the I-beam table-support frame includes an upper portion and a lower portion, wherein a top surface of the upper portion of the I-beam table-support frame includes a plurality of rails, wherein the I-beam table-support frame is configured to connect to the work table such that a first roller of each respective pair of rollers moves along a respective rail of the plurality of rails and a second roller of each respective pair of rollers moves along a bottom surface of the upper portion of the I-beam table-support frame directly below the respective rail.

In some embodiments, the apparatus further includes a work table, wherein the base unit further includes a table-support frame configured to connect to the work table such that the work table can be moved along the table-support frame during operation of the power saw; and at least a first saw-support member having a first end and a second end, wherein the first end of the at least first saw-support member is coupled to the table-support frame, wherein the second end of the at least first saw-support member is coupled to the saw mount such that the saw mount is located in a position above the table-support frame. In some embodiments, the apparatus further includes a work table, wherein the base unit further includes a table-support frame configured to connect to the work table such that the work table can be moved along the table-support frame during operation of the power saw; and at least a first saw-support member having a first end and a second end, wherein the first end of the at least first saw-support member is coupled to the table-support frame, wherein the second end of the at least first saw-support member is coupled to the saw mount such that the saw mount is located in a position above the table-support frame, and wherein a height of the position above the table-support frame is adjustable. In some embodiments, the apparatus further includes a work table, wherein the base unit further includes a table-support frame configured to connect to the work table such that the work table can be moved along the table-support frame during operation of the power saw, wherein the fixed position in which the power saw is held by the saw mount includes an angle of a blade of the power saw relative to the work table, and wherein the angle is adjustable.

In some embodiments of the apparatus, the trigger mechanism includes: a trigger press configured to depress the throttle button on the power saw, wherein the trigger press is disengaged from the throttle button in a default position; and a spring configured to provide the default position for the trigger press.

In some embodiments of the apparatus, the saw mount includes: a platform configured to support a bottom portion of the power saw; and a pivotable connection arm coupled to the platform and configured to pivot between an open position and a closed position, wherein the connection arm is configured to couple to a top portion of the power saw when the power saw is placed on the platform and the connection arm is placed in the closed position. In some embodiments, the saw mount includes: a platform configured to support a bottom portion of the power saw; and a pivotable connection arm coupled to the platform and configured to pivot between an open position and a closed position, wherein the connection arm is configured to couple to a top portion of the power saw when the power saw is placed on the platform and the connection arm is placed in the closed position, wherein the connection arm includes a hood support configured to couple to a hood of the power saw. In some embodiments, the saw mount includes: a connection arm configured to couple to a top portion of the power saw; and a hook configured to support a handle of the power saw such that the power saw hangs from the hook when the power saw is coupled to the saw mount.

In some embodiments of the apparatus, the saw mount includes: a connection arm configured to couple to a top portion of the power saw; and a hook configured to support a handle of the power saw such that the power saw hangs from the hook when the power saw is coupled to the saw mount, wherein the hook is L-shaped. In some embodiments, the saw mount includes: a connection arm configured to couple to a top portion of the power saw; and a hook configured to support a handle of the power saw such that the power saw hangs from the hook when the power saw is coupled to the saw mount, wherein the hook includes a vice-style stabilizer configured to keep the handle of the power saw stationary when the power saw is coupled to the saw mount. In some embodiments, the saw mount includes: a connection arm configured to couple to a top portion of the power saw; and a hook configured to support a handle of the power saw such that the power saw hangs from the hook when the power saw is coupled to the saw mount, wherein the hook is L-shaped, and wherein the hook includes a vice-style stabilizer configured to keep the handle of the power saw stationary when the power saw is coupled to the saw mount. In some embodiments, the saw mount includes: a connection arm configured to couple to a top portion of the power saw, wherein the connection arm includes a hood support configured to couple to a hood of the power saw; and a hook configured to support a handle of the power saw such that the power saw hangs from the hook when the power saw is coupled to the saw mount.

In some embodiments, the present invention provides a method for operating a hand-held power saw on a portable mount system, wherein the power saw includes a saw motor that has a throttle that is controlled by a throttle button on the power saw, the method including providing a foldable stand; providing a base unit, wherein the base unit includes a saw mount unfolding the foldable stand; coupling the base unit to the unfolded stand; coupling the power saw to the saw mount of the base unit such that the power saw is held in a fixed position; starting the saw motor; and controlling the throttle of the started motor without using hands. In some embodiments, the coupling of the base unit to the unfolded stand is performed without using tools. In some embodiments, the coupling of the power saw to the saw mount is performed without using tools.

In some embodiments, the method further includes deflecting exhaust away from a blade end of the power saw.

In some embodiments of the method, the controlling of the throttle includes: providing a foot pedal; and selectively depressing the foot pedal. In some embodiments, the base unit further includes a trigger mechanism configured to selectively engage the throttle button on the power saw, wherein the controlling of the throttle includes: providing a foot pedal; selectively depressing the foot pedal; and mechanically transferring force to the trigger mechanism based on the selectively depressing of the foot pedal, wherein the mechanically transferring of force to the trigger mechanism causes the trigger mechanism to engage the throttle button on the power saw. In some embodiments, the base unit further includes a trigger mechanism configured to selectively engage the throttle button on the power saw, wherein the controlling of the throttle includes: providing a foot pedal; selectively depressing the foot pedal; and hydraulically transferring force to the trigger mechanism based on the selectively depressing of the foot pedal, wherein the hydraulically transferring of force to the trigger mechanism causes the trigger mechanism to engage the throttle button on the power saw. In some embodiments, the base unit further includes a trigger mechanism configured to selectively engage the throttle button on the power saw, wherein the controlling of the throttle includes: providing a foot pedal; selectively depressing the foot pedal; and transmitting a wireless signal based on the selectively depressing of the foot pedal; and receiving the transmitted wireless signal at the trigger mechanism, wherein the received wireless signal causes the trigger mechanism to engage the throttle button on the power saw.

In some embodiments, the method further includes pressing and holding a trigger release of the power saw without using hands.

In some embodiments, the method further includes providing a work table, wherein the providing of the base unit includes providing a table-support frame; coupling the work table to the table-support frame; placing a work piece on the work table; and moving the work table along the table-support frame during the controlling of the throttle in order to cut the work piece with the power saw.

In some embodiments of the method, the providing of the base unit that includes the saw mount includes providing a platform and providing a pivotable connection arm coupled to the platform, wherein the pivotable connection arm includes a hood support, and wherein the coupling of the power saw to the saw mount includes: pivoting the connection arm to an open position; placing the power saw on the platform; pivoting the connection arm to a closed position; and connecting the hood support to a hood of the power saw. In some embodiments of the method, the providing of the base unit that includes the saw mount includes providing a connection arm and providing a hook, wherein the connection arm includes a hood support, and wherein the coupling of the power saw to the saw mount includes: hanging a handle of the power saw on the hook such that the power saw is suspended by the hook; and connecting the hood support to a hood of the power saw.

In some embodiments, the present invention provides an apparatus for mounting a hand-held power saw, wherein the power saw includes a saw motor that has a throttle that is controlled by a throttle button on the power saw, the apparatus including a foldable stand; a base unit configured to removably couple to the foldable stand, wherein the base unit includes: means for holding the power saw in a fixed position during operation of the power saw, and means for selectively engaging the throttle button on the power saw; and means for controlling the throttle of the saw motor without using hands, wherein the means for controlling the throttle is operatively coupled to the means for selectively engaging the throttle button.

In some embodiments, the apparatus further includes means for deflecting exhaust away from a blade end of the power saw during operation of the power saw. In some embodiments, the apparatus further includes means for pressing and holding a trigger release of the power saw during operation of the power saw without using hands.

In some embodiments of the apparatus, the means for controlling the throttle of the saw motor without using hands includes: a foot pedal; and means for mechanically transferring force to the means for selectively engaging the throttle button based on selectively depressing the foot pedal. In some embodiments, the means for controlling the throttle of the saw motor without using hands includes: a foot pedal; and means for hydraulically transferring force to the means for selectively engaging the throttle button based on selectively depressing the foot pedal. In some embodiments, the means for controlling the throttle of the saw motor without using hands includes: a foot pedal; means for transmitting a wireless signal to the means for selectively engaging the throttle button based on selectively depressing the foot pedal; and means for receiving the transmitted wireless signal at the means for selectively engaging the throttle button, wherein the means for selectively engaging the throttle button engages the throttle button based on the received wireless signal.

In some embodiments, the apparatus further includes a work table, wherein the base unit further includes a table-support frame; and means for coupling the work table to the table-support frame such that the work table can be moved along the table-support frame during operation of the power saw. In some embodiments, the means for holding the power saw in a fixed position during operation of the power saw includes: means for suspending the power saw by a handle of the power saw; and means for stabilizing a hood of the power saw.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. An apparatus for mounting a power saw, wherein the power saw includes a saw motor that has a throttle that is controlled by a throttle button on the power saw, the apparatus comprising:
   a stand;
   a base unit configured to removably couple to the stand, wherein the base unit includes:
      a saw mount configured to removably couple to the power saw in order to hold the power saw in a fixed position during operation of the power saw, and
      a trigger mechanism configured to selectively engage the throttle button on the power saw; and
   a hands-free throttle controller operatively coupled to the trigger mechanism and configured to provide operator control of the throttle of the saw motor, wherein the hands-free throttle controller includes:
      an operator controlled foot pedal integrated with the stand;
      a connector rod having a first end and a second end, wherein the first end of the connector rod is coupled to the foot pedal;
      a cable having a first end and a second end, wherein the first end of the cable is coupled to the trigger mechanism; and
      a connection mechanism having a first side and a second side, wherein the first side of the connection mechanism is coupled to the second end of the connector rod, wherein the second side of the connection mechanism is coupled to the second end of the cable, wherein the connection mechanism is configured to transfer mechanical force from the connector rod to the cable such that when the foot pedal is depressed and the power saw is coupled to the saw mount, the trigger mechanism engages the throttle button on the power saw.

2. The apparatus of claim 1, wherein the operator controlled foot pedal is coupled to a spring that is configured to keep the operator controlled foot pedal in a neutral position.

3. The apparatus of claim 1, wherein the saw mount further includes a trigger-release member that is configured to press and hold a trigger release of the power saw during operation of the power saw.

4. The apparatus of claim 1, further comprising:
   a work table,
   wherein the base unit further includes a table-support frame configured to connect to the work table such that the work table can be moved along the table-support frame during operation of the power saw, and
   wherein the work table includes a blade groove configured to provide space for a blade of the power saw to pass through as the work table is moved along the table-support frame during operation of the power saw.

5. The apparatus of claim 1, further comprising:
   a work table having a plurality of rollers on a bottom surface of the work table,
   wherein the base unit further includes a table-support frame having a plurality of rails on a top surface of the table-support frame, wherein the table-support frame is configured to connect to the work table such that the plurality of rollers of the work table can be moved along the plurality of rails of the table-support frame during operation of the power saw.

6. The apparatus of claim 1, further comprising:
   a work table, wherein the base unit further includes a table-support frame configured to connect to the work table such that the work table can be moved along the table-support frame during operation of the power saw; and
   at least a first saw-support member having a first end and a second end, wherein the first end of the at least first saw-support member is coupled to the table-support frame, wherein the second end of the at least first saw-support member is coupled to the saw mount such that the saw mount is located in a position above the table-support frame.

7. The apparatus of claim 1, wherein the trigger mechanism includes:
   a trigger press configured to depress the throttle button on the power saw, wherein the trigger press is disengaged from the throttle button in a default position; and
   a spring configured to provide the default position for the trigger press.

8. The apparatus of claim 1, wherein the saw mount includes:
   a connection arm configured to couple to a top portion of the power saw; and
   a hook configured to support a handle of the power saw such that the power saw hangs from the hook when the power saw is coupled to the saw mount.

9. The apparatus of claim 1, wherein the saw mount includes:

a connection arm configured to couple to a top portion of the power saw; and a hook configured to support a handle of the power saw such that the power saw hangs from the hook when the power saw is coupled to the saw mount, wherein the hook is L-shaped.

10. The apparatus of claim 1, wherein the saw mount further includes a trigger-release member that is configured to press and hold a trigger release of the power saw during operation of the power saw, wherein the apparatus further comprises:

a work table,
wherein the base unit further includes a table-support frame configured to connect to the work table such that the work table can be moved along the table-support frame during operation of the power saw, and
wherein the work table includes a blade groove configured to provide space for a blade of the power saw to pass through as the work table is moved along the table-support frame during operation of the power saw.

11. The apparatus of claim 1, wherein the saw mount further includes a trigger-release member that is configured to press and hold a trigger release of the power saw during operation of the power saw, wherein the apparatus further comprises:

a work table having a plurality of rollers on a bottom surface of the work table,
wherein the base unit further includes a table-support frame having a plurality of rails on a top surface of the table-support frame, wherein the table-support frame is configured to connect to the work table such that the plurality of rollers of the work table can be moved along the plurality of rails of the table-support frame during operation of the power saw.

12. The apparatus of claim 1, wherein the saw mount further includes a trigger-release member that is configured to press and hold a trigger release of the power saw during operation of the power saw, wherein the apparatus further comprises:

a work table, wherein the base unit further includes a table-support frame configured to connect to the work table such that the work table can be moved along the table-support frame during operation of the power saw; and
at least a first saw-support member having a first end and a second end, wherein the first end of the at least first saw-support member is coupled to the table-support frame, wherein the second end of the at least first saw-support member is coupled to the saw mount such that the saw mount is located in a position above the table-support frame.

13. The apparatus of claim 1, wherein the saw mount further includes:

a connection arm configured to couple to a top portion of the power saw, and
a hook configured to support a handle of the power saw such that the power saw hangs from the hook when the power saw is coupled to the saw mount, wherein the apparatus further comprises:
a work table,
wherein the base unit further includes a table-support frame configured to connect to the work table such that the work table can be moved along the table-support frame during operation of the power saw, and
wherein the work table includes a blade groove configured to provide space for a blade of the power saw to pass through as the work table is moved along the table-support frame during operation of the power saw.

14. The apparatus of claim 1, wherein the saw mount further includes:

a connection arm configured to couple to a top portion of the power saw, and
a hook configured to support a handle of the power saw such that the power saw hangs from the hook when the power saw is coupled to the saw mount, wherein the apparatus further comprises:
a work table having a plurality of rollers on a bottom surface of the work table,
wherein the base unit further includes a table-support frame having a plurality of rails on a top surface of the table-support frame, wherein the table-support frame is configured to connect to the work table such that the plurality of rollers of the work table can be moved along the plurality of rails of the table-support frame during operation of the power saw.

15. The apparatus of claim 1, wherein the operator controlled foot pedal is coupled to a spring that is configured to keep the operator controlled foot pedal in a neutral position, wherein the saw mount further includes a trigger-release member that is configured to press and hold a trigger release of the power saw during operation of the power saw, wherein the trigger mechanism includes:

a trigger press configured to depress the throttle button on the power saw, wherein the trigger press is disengaged from the throttle button in a default position, and
a spring configured to provide the default position for the trigger press,
wherein the apparatus further comprises:
a work table having a plurality of rollers on a bottom surface of the work table,
wherein the base unit further includes a table-support frame having a plurality of rails on a top surface of the table-support frame, wherein the table-support frame is configured to connect to the work table such that the plurality of rollers of the work table can be moved along the plurality of rails of the table-support frame during operation of the power saw.

16. The apparatus of claim 1, wherein the saw mount further includes an exhaust-deflection device, and wherein the exhaust-deflection device is configured to deflect saw-motor exhaust away from an operator of the power saw during operation of the power saw.

17. An apparatus for mounting a power saw, wherein the power saw includes a gas-powered saw motor that has a throttle that is controlled by a throttle button on the power saw, the apparatus comprising:

a stand;
a base unit configured to removably couple to the stand, wherein the base unit includes:
a saw mount configured to removably couple to the power saw in order to hold the power saw in a fixed position during operation of the power saw, and
a trigger mechanism coupled to the saw mount and configured to selectively engage the throttle button on the power saw; and
a hands-free throttle controller operatively coupled to the trigger mechanism and configured to provide operator control of the throttle of the saw motor, wherein the saw mount further includes an exhaust-deflection device coupled to the saw mount and configured to deflect saw-motor exhaust away from an operator of the power saw during operation of the power saw.

18. The apparatus of claim 17, wherein the hands-free throttle controller includes an operator controlled foot pedal.

19. The apparatus of claim 17, further comprising:
a work table,
wherein the base unit further includes a table-support frame configured to connect to the work table such that the work table can be moved along the table-support frame during operation of the power saw, and
wherein the work table includes a blade groove configured to provide space for a blade of the power saw to pass through as the work table is moved along the table-support frame during operation of the power saw.

20. The apparatus of claim 17, further comprising:
a work table having a plurality of rollers on a bottom surface of the work table,
wherein the base unit further includes a table-support frame having a plurality of rails on a top surface of the table-support frame, wherein the table-support frame is configured to connect to the work table such that the plurality of rollers of the work table can be moved along the plurality of rails of the table-support frame during operation of the power saw.

21. The apparatus of claim 17, further comprising:
a work table, wherein the base unit further includes a table-support frame configured to connect to the work table such that the work table can be moved along the table-support frame during operation of the power saw; and
at least a first saw-support member having a first end and a second end, wherein the first end of the at least first saw-support member is coupled to the table-support frame, wherein the second end of the at least first saw-support member is coupled to the saw mount such that the saw mount is located in a position above the table-support frame.

22. The apparatus of claim 17, wherein the trigger mechanism includes:
a trigger press configured to depress the throttle button on the power saw, wherein the trigger press is disengaged from the throttle button in a default position; and
a spring configured to provide the default position for the trigger press.

* * * * *